(12) United States Patent
Ohno et al.

(10) Patent No.: US 11,377,058 B2
(45) Date of Patent: Jul. 5, 2022

(54) VEHICLE SEAT

(71) Applicants: Toyota Jidosha Kabushiki Kaisha, Toyota (JP); Toyoda Gosei Co., Ltd., Kiyosu (JP); Toyota Boshoku Kabushiki Kaisha, Kariya (JP)

(72) Inventors: Mitsuyoshi Ohno, Miyoshi (JP); Takashi Iida, Kiyosu (JP); Shuji Yamamoto, Kiyosu (JP); Shigemi Mase, Kiyosu (JP); Hiroyuki Tomita, Aichi-ken (JP)

(73) Assignees: TOYOTA JIDOSHA KABUSHIKI KAISHA, Toyota (JP); TOYODA GOSEI CO., LTD., Kiyosu (JP); TOYOTA BOSHOKU KABUSHIKI KAISHA, Kariya (JP)

( * ) Notice: Subject to any disclaimer, the term of this patent is extended or adjusted under 35 U.S.C. 154(b) by 5 days.

(21) Appl. No.: 16/896,729

(22) Filed: Jun. 9, 2020

(65) Prior Publication Data
US 2020/0391686 A1 Dec. 17, 2020

(30) Foreign Application Priority Data
Jun. 12, 2019 (JP) .............................. JP2019-109921

(51) Int. Cl.
*B60R 21/207* (2006.01)
*B60N 2/427* (2006.01)
(Continued)

(52) U.S. Cl.
CPC ...... *B60R 21/207* (2013.01); *B60R 21/23138* (2013.01); *B60N 2/42763* (2013.01);
(Continued)

(58) Field of Classification Search
CPC .. B60N 2/4221; B60N 2/0276; B60N 2/4263; B60N 4/42718; B60R 21/2171; B60R 21/207
See application file for complete search history.

(56) References Cited

U.S. PATENT DOCUMENTS 8,973,886 B2 * 3/2015 Breen .................... B60N 2/502 248/584
10,899,456 B2 * 1/2021 Penley ............... B64D 11/0619
(Continued)

FOREIGN PATENT DOCUMENTS

CN 112078451 A * 12/2020 ............... B60N 2/62
DE 102009041540 A1 * 4/2010 ........... B60R 21/207
(Continued)

*Primary Examiner* — Karen Beck
(74) *Attorney, Agent, or Firm* — Dinsmore & Shohl LLP

(57) ABSTRACT

Provided is a vehicle seat having a seat cushion, a submarine bar, an airbag main body, a bag retainer, and a transmission member. The seat cushion is shifted by a tilting mechanism or a lifting mechanism. The submarine bar is suspended across side frames. The airbag main body inflates and deploys inside the seat cushion. The bag retainer is at least partially disposed inside the airbag main body and retains an inflator. The transmission member transmits, to the submarine bar, a load that acts on the bag retainer when the airbag main body inflates and deploys in a state where the seat cushion has been shifted upward.

10 Claims, 18 Drawing Sheets

(51) Int. Cl.
  *B60R 21/231* (2011.01)
  *B60R 21/16* (2006.01)
  *B60R 21/00* (2006.01)
  *B60N 2/58* (2006.01)
(52) U.S. Cl.
  CPC ............... *B60N 2002/5808* (2013.01); *B60R 2021/0004* (2013.01); *B60R 2021/161* (2013.01); *B60R 2021/2076* (2013.01); *B60R 2021/23146* (2013.01)

(56) References Cited

U.S. PATENT DOCUMENTS

| | | | | |
|---|---|---|---|---|
| 2003/0052519 | A1* | 3/2003 | Reynolds | B60R 21/207 297/216.1 |
| 2007/0205587 | A1* | 9/2007 | Yoshikawa | B60N 2/42718 280/730.1 |
| 2007/0235991 | A1* | 10/2007 | Yoshikawa | B60R 21/207 280/730.1 |
| 2013/0092814 | A1* | 4/2013 | Breen | B60N 2/506 248/584 |
| 2017/0028875 | A1 | 2/2017 | Masuda | |
| 2019/0106029 | A1* | 4/2019 | Komura | B60N 2/62 |
| 2020/0377051 | A1* | 12/2020 | Kobayashi | B60R 21/237 |

FOREIGN PATENT DOCUMENTS

| | | | | |
|---|---|---|---|---|
| EP | 1792771 A1 | * | 6/2007 | ......... B60N 2/42718 |
| JP | 2005-193844 A | | 7/2005 | |
| JP | 2007-230443 A | | 9/2007 | |
| JP | 2007-230456 A | | 9/2007 | |
| JP | 2010-052535 A | | 3/2010 | |
| JP | 2011-001014 A | | 1/2011 | |
| JP | 2011-156907 A | | 8/2011 | |
| JP | 2017-030492 A | | 2/2017 | |
| JP | 2017128271 A | * | 7/2017 | |
| JP | 2019-064553 A | | 4/2019 | |
| JP | 2019172150 A | * | 10/2019 | |
| JP | 2020019330 A | * | 2/2020 | ........... B60R 21/207 |

\* cited by examiner

VEHICLE SEAT

CROSS-REFERENCE TO RELATED APPLICATIONS

This application claims priority to Japanese Patent Application No. 2019-109921 filed on Jun. 12, 2019, which is incorporated herein by reference in its entirety including the specification, drawings and abstract.

BACKGROUND

1. Technical Field

The disclosure relates to a vehicle seat.

2. Description of Related Art

Japanese Patent Application Publication No. 2010-52535 (JP 2010-52535 A) discloses a vehicle seat having a cushion panel that constitutes a bottom part of a seat cushion, a seat pad that covers the cushion panel, and a cushion airbag that is provided between the cushion panel and the seat pad and fixed to the cushion panel.

SUMMARY

There is a vehicle seat of which a seat cushion is shifted upward by a tilting mechanism or a lifting mechanism. In this vehicle seat, when an occupant is in a comfortable posture and a frontal collision of the vehicle occurs, a load is less likely to be transmitted from a seatbelt to the hips of the occupant, and a load directed toward a seat front side is more likely to be input into a cushion airbag that has been shifted upward, than when the occupant is in a normal posture. The configuration of JP 2010-52535 A does not include means for withstanding a load that is input into the cushion airbag from an occupant who has moved toward a seat front side by inertia in a frontal collision, and therefore such load input is likely to cause deformation of the cushion airbag toward the seat front side. As a result, the occupant is less likely to receive a reaction force from the cushion airbag and more likely to move toward the seat front side by inertia, in which respect there is room for improvement.

The present disclosure provides a vehicle seat that has a seat cushion that is shifted by a tilting mechanism or a lifting mechanism and can restrain an occupant from moving toward a seat front side by inertia in a frontal collision of a vehicle including this vehicle seat.

A vehicle seat according to an aspect of the present disclosure includes: a seat cushion configured to be shifted in a seat up-down direction by a tilting mechanism or a lifting mechanism; a suspended member suspended across framework members that are provided inside the seat cushion, side by side at an interval in a seat width direction; a cushion airbag main body provided inside the seat cushion and configured to inflate and deploy upon being supplied with gas; a retaining member that is at least partially disposed inside the cushion airbag main body and is configured to retain an inflator that supplies the gas to the cushion airbag main body; and a transmission member configured to transmit, to the suspended member, a load that acts on the retaining member when the cushion airbag main body inflates and deploys in a state where the seat cushion has been shifted upward in the seat up-down direction.

In this vehicle seat, the cushion airbag main body inflates and deploys upon being supplied with the gas from the inflator in a frontal collision of the vehicle. Meanwhile, an occupant sitting in the vehicle seat moves toward a seat front side by inertia. Thus, a load directed toward the seat front side acts on the inflated and deployed cushion airbag main body, and this load is transmitted from the cushion airbag main body to the retaining member.

The load having been transmitted to the retaining member is transmitted to the suspended member through the transmission member. As a result, the cushion airbag main body is restrained from deforming toward the seat front side, and a decrease in a reaction force that the occupant receives from the cushion airbag main body is avoided. Therefore, the occupant can be restrained from moving toward the seat front side by inertia in a frontal collision of the vehicle.

The above vehicle seat may further include a panel member that is provided on the lower side of the cushion airbag main body in the seat up-down direction and supports the cushion airbag main body. The suspended member may be disposed on the lower side of the cushion airbag main body in the seat up-down direction, on the rear side of the panel member in a seat front-rear direction. The retaining member may be disposed on the upper side of the suspended member in the seat up-down direction, at a rear end portion of the inside of the cushion airbag main body in the seat front-rear direction.

In this configuration, the cushion airbag main body is supported by the panel member. The retaining member is disposed at the rear end portion of the inside of the cushion airbag main body in the seat front-rear direction. In other words, the retaining member is disposed inside the cushion airbag main body, at a position near the hips of the occupant. Since the retaining member is disposed at a position near the hips of the occupant, when a frontal collision of the vehicle occurs, the inflated and deployed cushion airbag main body and the retaining member are more likely to come into contact with each other at an early stage of deformation of the cushion airbag main body toward the seat front side.

Thus, a load acting from the occupant on the cushion airbag main body is transmitted to the suspended member at an early stage of a frontal collision of the vehicle, so that the cushion airbag main body is restrained from deforming and the panel member supporting the cushion airbag main body is also restrained from deforming. As a result, a decrease in the height position of an upper end portion of the cushion airbag main body in the seat up-down direction is avoided, and the occupant can be restrained from sinking into the seat cushion.

The above vehicle seat may further include a cushion airbag cover that covers the cushion airbag main body, and the panel member may include a mount part on which a part of the cushion airbag cover or a part of the cushion airbag main body is mounted.

In this configuration, when an occupant sits on the seat cushion, a load from the occupant acts on the cushion airbag main body and the cushion airbag cover. Since the part of the cushion airbag cover or the part of the cushion airbag main body is mounted on the mount part of the panel member, the cushion airbag cover or the cushion airbag main body is less likely to move. Thus, the cushion airbag cover or the cushion airbag main body can be restrained from shifting from its original position.

The above vehicle seat may further include a mounting member which is provided inside the cushion airbag main body, on the front side of the retaining member in the seat front-rear direction, and by which the part of the cushion airbag main body is mounted on the mount part.

In this configuration, the cushion airbag main body is held between the panel member and the mounting member. Thus, when the part of the cushion airbag main body tries to move toward a seat upper side, this movement of the cushion airbag main body is limited by the mounting member, so that the cushion airbag main body can be restrained from partially lifting off the panel member.

The mount part may be a hook part on which the part of the cushion airbag cover or the part of the cushion airbag main body is hung to mount the part of the cushion airbag cover or the part of the cushion airbag main body.

In this configuration, the part of the cushion airbag cover or the part of the cushion airbag main body is hung on the hook part and thereby mounted on the panel member. Thus, mounting the part of the cushion airbag cover or the part of the cushion airbag main body to the panel member does not require any other member, and therefore the part of the cushion airbag cover or the part of the cushion airbag main body can be mounted on the panel member by a simple configuration.

The transmission member may have a bracket provided on the suspended member, and a fastening member that fastens together the bracket and the retaining member.

In this configuration, the bracket and the retaining member are fastened together by the fastening member, so that a load acting on the retaining member is transmitted from the retaining member to the suspended member through the fastening member and the bracket. Since the suspended member and the retaining member need not be directly fastened together, restrictions on the shape and arrangement of the suspended member can be reduced.

The transmission member may have a protruding member that protrudes from the retaining member toward the outside of the cushion airbag main body, and a fixed member that has an insertion part into which a part of the protruding member is inserted so as to be relatively movable and that is fixed to the suspended member.

In this configuration, a part of the protruding member is inserted in the insertion part so as to be relatively movable. Thus, when a part of the seat cushion is shifted, the cushion airbag main body is allowed to shift according to the shift of the seat cushion while the load transmitting function is maintained. This can increase the flexibility of the installation position of the cushion airbag main body in the seat cushion.

The insertion part may have a through-hole with such an inside diameter that a gap is left between the through-hole and an outer circumferential surface of the protruding member.

In this configuration, when a frontal collision of the vehicle occurs, a load from the occupant acts on the inflated and deployed cushion airbag main body, so that the cushion airbag main body and the retaining member come into contact with each other and the retaining member is shifted. As a result of this shift, the protruding member and a hole wall of the through-hole come into contact with each other, and the load is thereby transmitted from the retaining member to the suspended member through the fixed member. Thus, simply inserting the protruding member into the through-hole makes it possible to transmit a load to the suspended member. This configuration can increase the efficiency of assembling the transmission member compared with one in which the protruding member is press-fitted into the insertion part.

The transmission member may have a protruding member that protrudes from the retaining member toward the outside of the cushion airbag main body, and a fabric member that is provided on the protruding member and wrapped around the suspended member.

In this configuration, when a frontal collision of the vehicle occurs, a load from the occupant acts on the inflated and deployed cushion airbag main body, so that the cushion airbag main body, the inflator, and the retaining member are shifted toward the seat front side as one unit. As a result of this shift of the retaining member, the protruding member is shifted toward the seat front side and the fabric member is pulled toward the seat front side. The fabric member and the suspended member come into contact with each other, and the load is thereby transmitted to the suspended member. Thus, wrapping the fabric member provided on the protruding member around the suspended member makes it possible to transmit a load to the suspended member. This configuration can reduce the weight of the vehicle seat compared with one in which a metal transmission member is fixed to the suspended member.

The above vehicle seat may further include a connecting member that connects the suspended member and the retaining member to each other.

In this configuration, when a frontal collision of the vehicle occurs, a load acting on the cushion airbag main body as the occupant moves toward the seat front side by inertia is transmitted from the retaining member to the suspended member through the transmission member. In this case, a load directed toward the seat front side acts on the cushion airbag main body, which may cause a rear part of the cushion airbag main body to lift off toward the seat upper side.

Since the suspended member and the retaining member are connected to each other by the connecting member, the retaining member is restrained from shifting relatively to the suspended member. Further, as the retaining member is restrained from shifting, the rear part of the cushion airbag main body is also restrained from shifting toward the seat upper side. Thus, the rear part of the cushion airbag main body can be restrained from lifting off toward the seat upper side.

As has been described above, the present disclosure has an effect in that, in a frontal collision of a vehicle including a vehicle seat having a seat cushion that is shifted by a tilting mechanism or a lifting mechanism, an occupant can be restrained from moving toward a seat front side by inertia.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
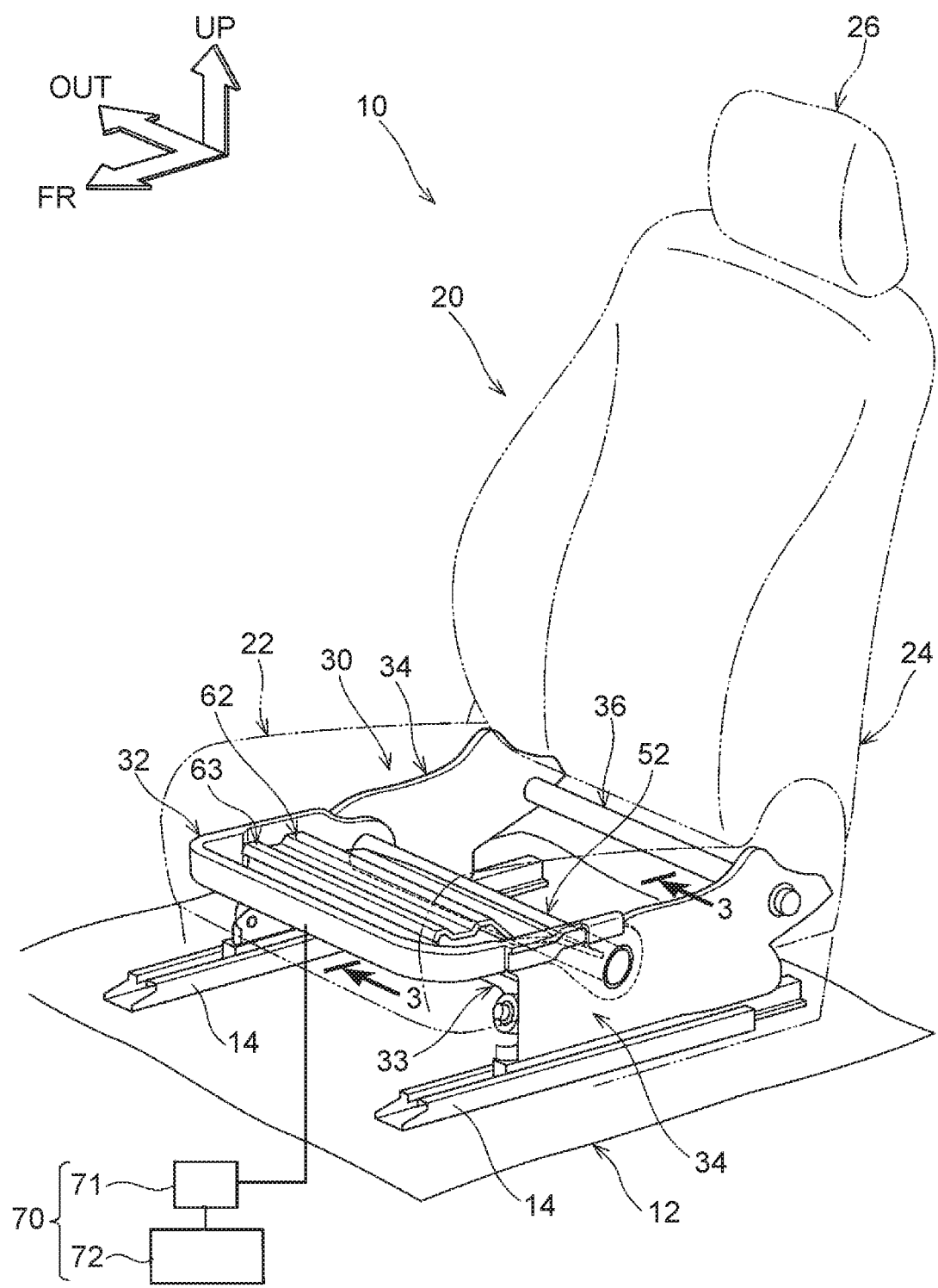
FIG. 1 is a perspective view schematically showing a vehicle seat according to a first embodiment.

FIG. 1 shows a vehicle seat 20 according to a first embodiment that is applied to a vehicle 10. In FIG. 1, a part of an airbag mounting structure 50 (see FIG. 3) to be described later is not shown. The vehicle 10 has a floor panel 12 constituting a floor of the vehicle 10. A pair of left and right guide rails 14 is provided on the floor panel 12. The vehicle seat 20 is movable in a vehicle front-rear direction along the guide rails 14.

In the drawings, the arrows FR, UP, and OUT indicate a front side in a seat front-rear direction, an upper side in a seat up-down direction, and an outer side in a seat width direction, respectively. The seat front-rear direction, the seat up-down direction, and the seat width direction are directions orthogonal to one another. The seat front-rear direction corresponds to a vehicle front-rear direction and a horizontal direction. The seat up-down direction corresponds to a vehicle up-down direction. The seat width direction corresponds to a vehicle width direction. Unless otherwise noted, directions referred to simply as frontward, rearward, upward, downward, leftward, and rightward in the following description mean respectively frontward and rearward in the seat front-rear direction, upward and downward in the seat up-down direction, and leftward and rightward in the seat width direction as seen in an advancing direction of the vehicle 10. The seat width direction will be referred to simply as a width direction. A plan view means a view of an object as seen from an upper side in the seat up-down direction. A side view means a view of an object as seen from the width direction.

Overall Configuration

Figure 2:
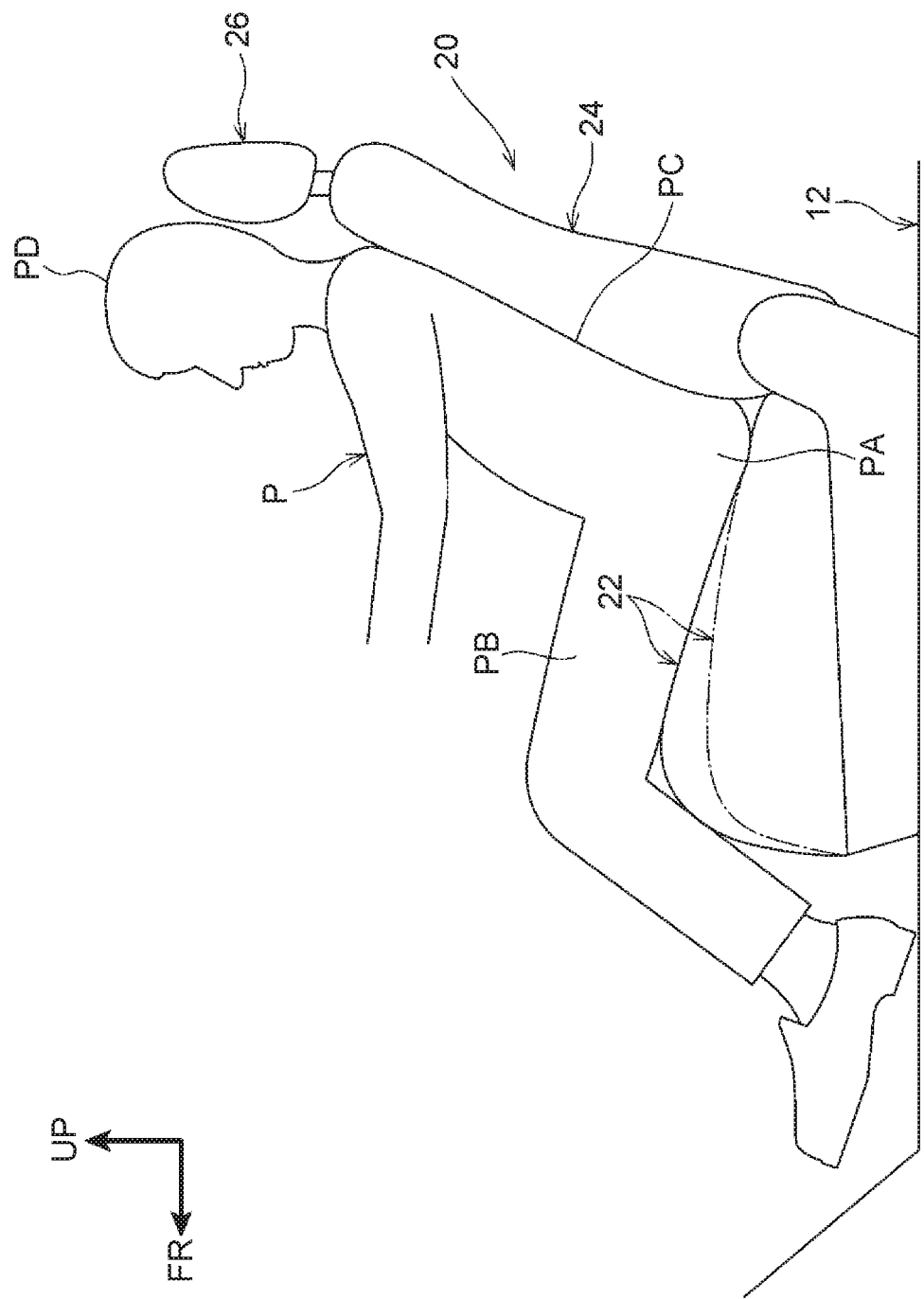
FIG. 2 is a side view showing a state before and after a seat cushion of the vehicle seat shown in FIG. 1 is tilted upward.

The vehicle seat 20 shown in FIG. 2 has, for example, a seat cushion 22, a seat back 24, a headrest 26, the airbag mounting structure 50 (see FIG. 3), and a seatbelt device (not shown). The seat cushion 22 supports hips PA and thighs PB of an occupant P. The seat back 24 supports a back PC of the occupant P. The seat back 24 can be adjusted (inclined) to an arbitrary angle relative to the seat front-rear direction by a reclining mechanism (not shown) provided in the seat cushion 22. The headrest 26 supports a head PD of the occupant P. The seatbelt device (not shown) restrains the occupant P.

Figure 3:
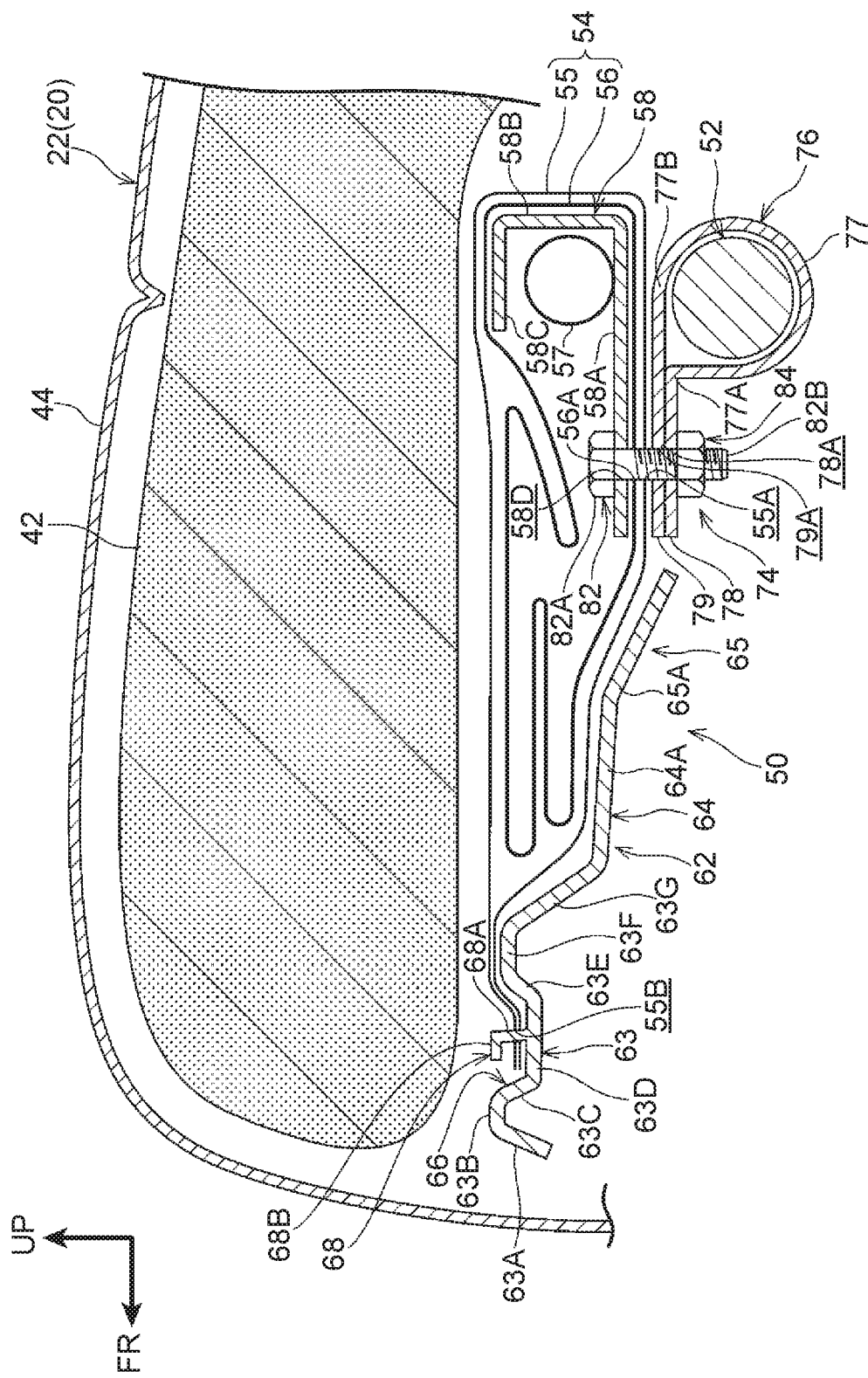
FIG. 3 is a vertical sectional view inside the seat cushion of the vehicle seat shown in FIG. 1 (an enlarged sectional view taken along line 3-3 of FIG. 1)

The seat cushion 22 shown in FIG. 1 has a seat frame 30, a cushion pad 42 (see FIG. 3), and a seat skin 44 (see FIG. 3). The seat frame 30 includes a front frame 32 extending in the width direction, a lower frame 33, a rear frame 36, and a pair of left and right side frames 34 extending in the seat front-rear direction. The seat frame 30 is a main part to receive a load from the occupant P (see FIG. 2). Specifically, the front frame 32 has a U-shape opening rearward as seen in a plan view. The lower frame 33 is disposed under the front frame 32.

The side frame 34 is an example of the framework member, and has a plate shape with a thickness direction oriented in the width direction. Front end portions of the left and right side frames 34 are coupled together in the width direction by the lower frame 33. Rear end portions of the left and right side frames 34 are coupled together in the width direction by the rear frame 36. Thus, the side frames 34 are provided inside (on an inner side of) the seat cushion 22, side by side at an interval in the width direction.

The cushion pad 42 shown in FIG. 3 is made of a foam body, such as a urethane pad. The cushion pad 42 is provided on the upper side of the seat frame 30 (see FIG. 1). The seat skin 44 covers a surface of the cushion pad 42.

Configuration of Main Parts

As shown in FIG. 3, the airbag mounting structure 50 has a submarine bar 52 as an example of the suspended member, a cushion airbag 54, an inflator 57, a bag retainer 58 as an example of the retaining member, and a transmission member 74. The airbag mounting structure 50 further has a front panel 62 as an example of the panel member and a tilting mechanism 70 (see FIG. 1).

Submarine Bar

The submarine bar 52 shown in FIG. 1 has, for example, a columnar shape with an axial direction oriented in the width direction, and is suspended across the pair of left and right side frames 34. As seen in a plan view, the submarine bar 52 is disposed between the front frame 32 and the rear frame 36. As seen in a side view, the submarine bar 52 is disposed on a lower side of the cushion airbag 54 to be described later, on a rear side of the front panel 62.

Specifically, both end portions of the submarine bar 52 in the axial direction are inserted into bearings (not shown) provided on the left and right side frames 34. Thus, the submarine bar 52 is coupled to the left and right side frames 34 so as to be rotatable (turnable) with the axial direction oriented in the width direction. Rear portions of the front frame 32 are fixed to the submarine bar 52. The front frame 32 is tilted upward or downward as the submarine bar 52 rotates.

Cushion Airbag

The cushion airbag 54 shown in FIG. 3 is provided inside the seat cushion 22. The cushion airbag 54 has an airbag cover 55 as an example of the cushion airbag cover, and an airbag main body 56 as an example of the cushion airbag main body. The cushion airbag 54 is disposed on the lower side of the cushion pad 42, with a front part thereof disposed on the upper side of the front panel 62 to be described later.

The airbag cover 55 is formed as a fabric bag. The airbag cover 55 covers the airbag main body 56. A portion of the airbag cover 55 is formed as a breaking portion that breaks as a force acts thereon from inside when the airbag main body 56 deploys. A through-hole 55B is formed at a front end portion of the airbag cover 55. A through-hole 55A is formed at a lower portion of the airbag cover 55.

The airbag main body 56 is formed by sewing a nylon- or polyester-based fabric material (base fabric) into a bag. A through-hole 56A is formed at a portion of the airbag main body 56. The airbag main body 56 is housed inside the airbag cover 55 in a folded state. The inflator 57 to be described later is disposed inside the airbag main body 56. The structure of the cushion airbag 54 is such that the airbag main body 56 inflates and deploys upon being supplied with gas from the inflator 57. When inflating and deploying, the airbag main body 56 deploys to an outside of the airbag cover 55 by breaking the airbag cover 55.

Inflator

The inflator 57 is configured as a cylinder type that has a gas ejection part (not shown) provided at one end portion in the width direction. The inflator 57 is provided (disposed) at a rear end portion of an inside of the airbag main body 56 (seat cushion 22). The inflator 57 supplies gas to the airbag main body 56. When the inflator 57 is activated, the airbag main body 56 supplied with gas from the inflator 57 inflates and deploys on a front side of the inflator 57. The inflator 57 is activated when a control unit 72 (see FIG. 1) to be described later detects a frontal collision based on a signal from a collision detection unit (not shown).

Bag Retainer

The bag retainer 58 is formed, for example, by bending a steel plate into a U-shape opening frontward as seen in a side view. The bag retainer 58 is disposed (housed) on the upper side of the submarine bar 52, at a rear end portion of the inside of the airbag main body 56, and retains the inflator 57.

Specifically, as seen in a side view, the bag retainer 58 has a bottom plate 58A extending in the front-rear direction, a vertical plate 58B standing upright at a rear end of the bottom plate 58A, and an upper plate 58C extending frontward from an upper end of the vertical plate 58B.

The lengths of the bottom plate 58A, the vertical plate 58B, and the upper plate 58C in the width direction are substantially equal. The inflator 57 is housed in a space surrounded by the bottom plate 58A, the vertical plate 58B, and the upper plate 58C. The inflator 57 is retained by the bag retainer 58 by being fixed to the bottom plate 58A with a fastener (not shown). In the width direction, the length of each of the bottom plate 58A, the vertical plate 58B, and the upper plate 58C is longer than the length of the inflator 57. In the seat front-rear direction, the length of the upper plate 58C is shorter than the length of the bottom plate 58A and long enough to cover the inflator 57 from the upper side. A through-hole 58D extending through the bottom plate 58A in a thickness direction is formed at a portion of the bottom plate 58A, on the front side relative to the center thereof in the front-rear direction.

In a housed state where the airbag main body 56 is folded, the vertical plate 58B and the upper plate 58C are disposed facing a rear end portion of the airbag main body 56 from a close distance. A lower part of the airbag main body 56 is disposed on the lower side of the bottom plate 58A and extends frontward along the bottom plate 58A. The through-hole 55A and the through-hole 56A coincide with the through-hole 58D in the up-down direction.

Front Panel

A rear part of the front panel 62 is provided on the lower side of the cushion airbag 54 (airbag main body 56). The front panel 62 is formed, for example, by pressing a steel plate. The front panel 62 supports the cushion airbag 54. Specifically, the front panel 62 is elongated in the front-rear direction and has a substantially rectangular shape as seen in a plan view. The length of the front panel 62 in the front-rear direction is, for example, about half the length of the seat cushion 22 in the front-rear direction.

The front panel 62 has a front part 63, a central part 64, and a rear part 65 sequentially in the front-rear direction. The front part 63 has a substantially trapezoidal wave shape as seen in a side view. Thus, by being bent at a plurality of points, the front part 63 is enhanced in structural strength against bending and twisting. Specifically, the front part 63 has a front wall 63A, an upper wall 63B, an inclined wall 63C, a bottom wall 63D, an inclined wall 63E, an upper wall 63F, and an inclined wall 63G.

The front wall 63A extends from a front end of the upper wall 63B toward a front lower side. The inclined wall 63G extends from a rear end of the upper wall 63F toward a rear lower side. A recess 66 is formed by the inclined wall 63C, the bottom wall 63D, and the inclined wall 63E. In other words, the front part 63 has the recess 66 opening upward that has a trapezoidal shape with the top side longer than the bottom side. A plurality of hook parts 68 is formed on the bottom wall 63D, at intervals in the width direction.

The hook part 68 is an example of the mount part, and has an upright portion 68A standing upright on the bottom wall 63D, and an extended portion 68B extended frontward from an upper end of the upright portion 68A. Thus, the hook parts 68 are formed in the recess 66. A circumferential edge portion of the through-hole 55B of the airbag cover 55 is hung on the hook part 68 and thereby mounted on the front panel 62.

The central part 64 has an inclined wall 64A. The inclined wall 64A extends from a rear end of the inclined wall 63G toward a rear lower side. The rear part 65 has an inclined wall 65A. The inclined wall 65A extends from a rear end of the inclined wall 64A toward a rear lower side. While this is not shown, when the inclination angles of the inclined wall 63G, the inclined wall 64A, and the inclined wall 65A relative to the front-rear direction are θ1, θ2, and θ3, respectively, the relation among the degrees of the inclined angles θ1, θ2, and θ3 is, for example, θ1>θ3>θ2 in this embodiment.

As shown in FIG. 1, both end portions of the front panel 62 in the width direction are fixed to the front frame 32. Thus, the front panel 62 is, for example, integrated with the front frame 32. The front panel 62 is turnable around a central axis of the submarine bar 52 relative to the side frames 34. In other words, the inclination of the front panel 62 relative to the seat front-rear direction is changeable.

Tilting Mechanism

As shown in FIG. 1, the tilting mechanism 70 includes a motor 71 and the control unit 72 that controls a rotating action of the motor 71. The motor 71 is configured to turn the front frame 32 through a gear (not shown) and the submarine bar 52. Thus, the tilting mechanism 70 is configured to shift the seat cushion 22 in the up-down direction by turning the front panel 62 by the motor 71.

The control unit 72 is formed by, for example, an electronic control unit (ECU; not shown). The control unit 72 is electrically connected to the collision detection unit that detects a frontal collision of the vehicle 10 and a pre-crash sensor that predicts a frontal collision (neither is shown). Further, the control unit 72 is electrically connected to a manipulation switch (not shown). The manipulation switch is disposed at such a position that the occupant P (see FIG. 2) sitting in the vehicle seat 20 can manipulate the manipulation switch. The occupant P can shift the front frame 32 and a front part of the front panel 62 upward and downward by manipulating the manipulation switch.

Figure 4:
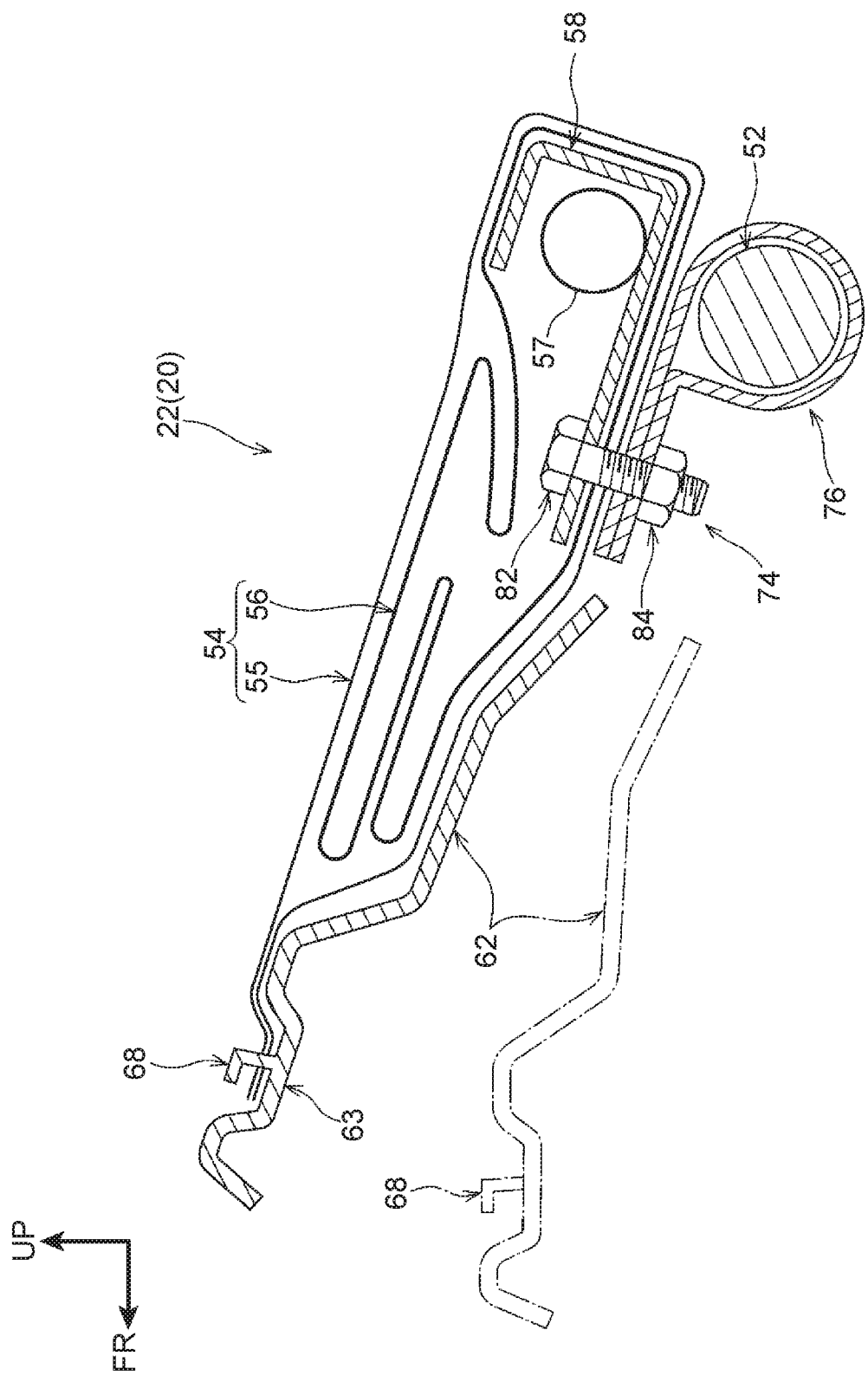
FIG. 4 is a vertical sectional view showing how a front panel of the vehicle seat shown in FIG. 3 is moved.

As shown in FIG. 4, a part from the bag retainer 58 to the submarine bar 52 is one unit. Therefore, when the front panel 62 is turned as the tilting mechanism 70 (see FIG. 1) is activated, and the inclination of the cushion airbag 54 relative to the front-rear direction changes, the submarine bar 52 is turned and a bracket 76 is inclined. Thus, as the angle of the front panel 62 changes, the angle of the bracket 76 also changes, so that a situation where a front part and a rear part of the cushion airbag 54 are disposed at different levels in the up-down direction can be avoided. This means that when the seat cushion 22 is inclined, a change in the state of arrangement of the airbag main body 56 relative to the occupant P (see FIG. 2) is avoided.

Transmission Member

The transmission member 74 has the bracket 76 provided on the submarine bar 52, and a bolt 82 and a nut 84 as an example of the fastening member that fastens together the bracket 76 and the bag retainer 58.

Bracket

The bracket 76 is formed by, for example, a steel plate. The bracket 76 is disposed on the lower side of the bag retainer 58 as seen in a side view. The length of the bracket 76 in the width direction is, for example, substantially equal to the length of the bag retainer 58 in the width direction. The bracket 76 and the bag retainer 58 hold a bottom part of each of the airbag cover 55 and the airbag main body 56 therebetween in the up-down direction. In FIG. 3, to clarify the arrangement of members, the members are shown with a gap left between each other although some members are actually in contact with each other.

Specifically, the bracket 76 has a structure in which a wrapped part 77, and a lower plate 78 and an upper plate 79 extending frontward from the wrapped part 77 are integrated. The lengths of the wrapped part 77, the lower plate 78, and the upper plate 79 in the width direction are substantially equal.

As seen in a side view, the wrapped part 77 has a substantially C-shape. The wrapped part 77 is wrapped around the submarine bar 52 so as to open toward an obliquely front side relative to the up-down direction. A portion of the wrapped part 77 is welded to a part of an outer circumferential surface of the submarine bar 52. As seen in a side view, a front-side end portion of the wrapped part 77 will be referred to as a front end portion 77A, and a rear-side end portion of the wrapped part 77 will be referred to as a rear end portion 77B. The rear end portion 77B is disposed at a higher position than the front end portion 77A.

The lower plate 78 extends frontward from the front end portion 77A along the front-rear direction. As seen in a plan view, the outer shape of the lower plate 78 is a rectangular shape that is long in the width direction and short in the front-rear direction. A through-hole 78A extending through the lower plate 78 in the up-down direction is formed at a central portion of the lower plate 78 in the front-rear direction.

The upper plate 79 extends frontward from the rear end portion 77B along the front-rear direction. As seen in a plan view, the outer shape of the upper plate 79 is a rectangular shape that is long in the width direction and short in the front-rear direction. A through-hole 79A extending through the upper plate 79 in the up-down direction is formed at a central portion of the upper plate 79 in the front-rear direction. The through-hole 79A and the through-hole 78A have circular shapes with similar diameters, and coincide with each other in the seat up-down direction.

Bolt and Nut

The bolt 82 has a head 82A and a shaft 82B. The head 82A is welded to an upper surface of the bottom plate 58A. The shaft 82B has a columnar shape and extends downward from the head 82A with an axial direction oriented in the up-down direction. An external thread is formed on an outer circumferential surface of the shaft 82B. The shaft 82B is inserted into the through-hole 58D, the through-hole 56A, and the through-hole 55A from the upper side toward the lower side, and extends (protrudes) downward beyond the airbag main body 56 and the airbag cover 55.

Further, the shaft 82B is inserted into the through-hole 79A and the through-hole 78A and extends downward beyond the lower plate 78. The nut 84 is screwed on the shaft 82B from below the lower plate 78, so that the bracket 76 and the bag retainer 58 are fastened together. As will be described later, a load acting on the bag retainer 58 is transmitted to the submarine bar 52 through the bolt 82 and the bracket 76. Thus, the transmission member 74 transmits, to the submarine bar 52, a load that acts on the bag retainer 58 when the airbag main body 56 inflates and deploys in a state where the seat cushion 22 has been shifted upward.

Workings and Effects

Next, the workings of the vehicle seat 20 of the first embodiment will be described.

Figure 5:
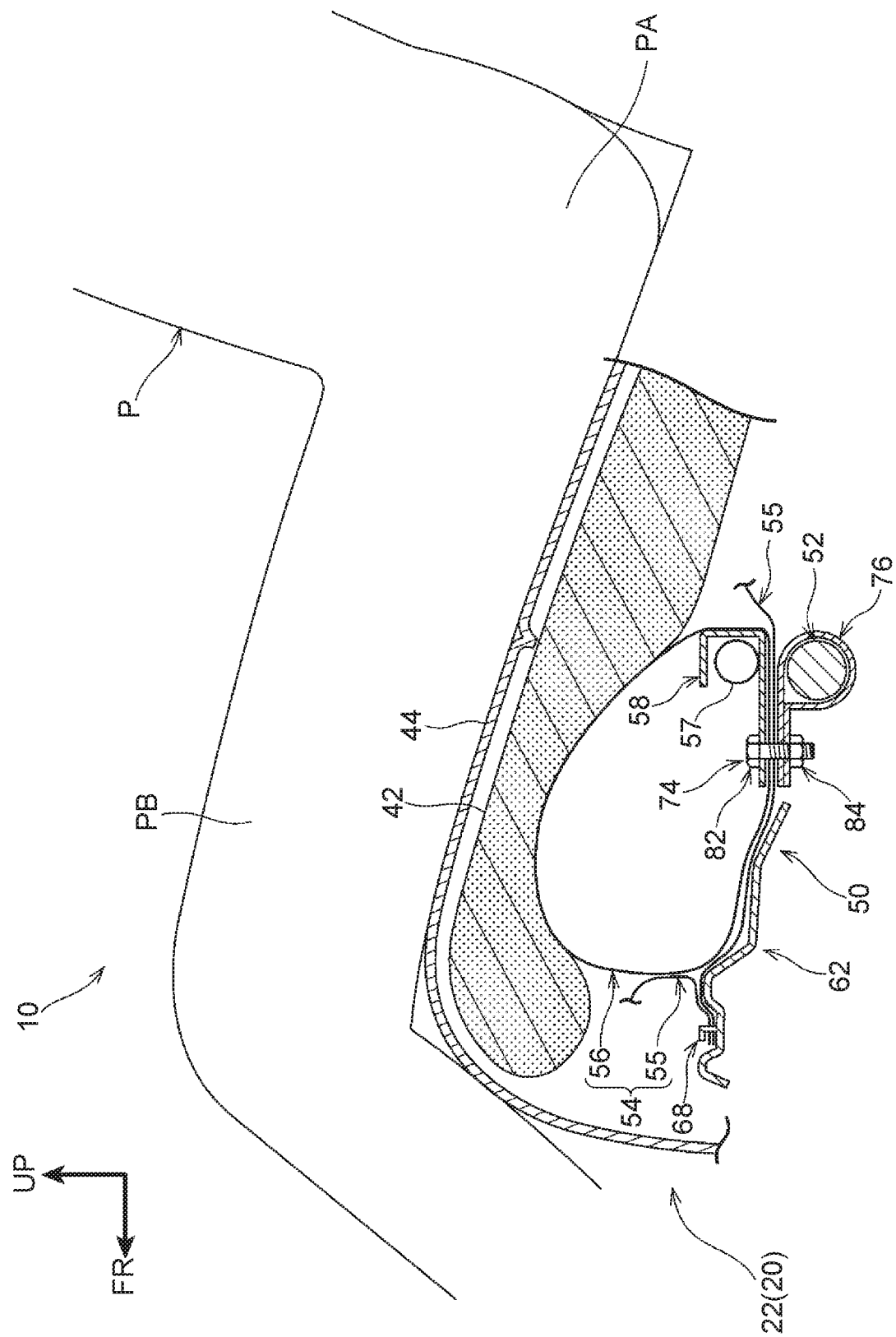
FIG. 5 is a vertical sectional view showing a state where an airbag main body of the vehicle seat shown in FIG. 1 is inflated and deployed.

As shown in FIG. 5, when the vehicle 10 is driving autonomously, the occupant P sitting in the vehicle seat 20 may change his or her posture from a normal posture to a resting posture or a comfortable posture by manipulating the reclining mechanism (not shown).

In such a case, when a frontal collision of the vehicle 10 occurs, the airbag main body 56 inflates and deploys upon being supplied with gas from the inflator 57 in the vehicle seat 20. Meanwhile, the occupant P sitting in the vehicle seat 20 moves frontward from the original sitting position by inertia. Thus, a load directed frontward acts from the occupant P on the inflated and deployed airbag main body 56. As this load acts on the airbag main body 56, the airbag main body 56 is deformed and a rear part thereof comes into contact with the bag retainer 58, provided inside the airbag main body 56, in the front-rear direction. This means that the load is transmitted from the airbag main body 56 to the bag retainer 58.

The load having been transmitted to the bag retainer 58 is transmitted to the submarine bar 52 through the transmission member 74. (This load is transmitted from the submarine bar 52 to the side frames 34 (see FIG. 1).) Thus, the load acting on the airbag main body 56 is reduced, and the airbag main body 56 is restrained from deforming frontward. As the airbag main body 56 is restrained from deforming, a decrease in a reaction force that the occupant P receives from the airbag main body 56 is avoided. Therefore, the occupant P can be restrained from moving frontward by inertia in a frontal collision of the vehicle 10. In other words, a so-called submarine phenomenon in which the occupant P restrained in the vehicle seat 20 by the seatbelt device (not shown) assumes a posture of sinking into the seat cushion 22 in a frontal collision of the vehicle 10 can be avoided.

In the vehicle seat 20, the airbag main body 56 is supported by the front panel 62. The bag retainer 58 is disposed at the rear end portion of the inside of the airbag main body 56. In other words, the bag retainer 58 is disposed inside the airbag main body 56, at a position near the hips PA of the occupant P. Since the bag retainer 58 is disposed at a position near the hips PA, when a frontal collision of the vehicle 10 occurs, the inflated and deployed airbag main body 56 and the bag retainer 58 are more likely to come into contact with each other at an early stage of frontward deformation of the airbag main body 56.

Thus, the load acting from the occupant P on the airbag main body 56 is transmitted to the submarine bar 52 at an early stage of a frontal collision of the vehicle 10, so that the airbag main body 56 is restrained from deforming. Further, as the load transmitted to the airbag main body 56 is reduced, the load transmitted from the airbag main body 56 to the front panel 62 is reduced and therefore the front panel 62 is restrained from deforming. As a result, a decrease in the height position of an upper end portion of the airbag main body 56 is avoided, and the occupant P can be restrained from sinking into the seat cushion 22.

Moreover, in the vehicle seat 20, when the occupant P sits on the seat cushion 22, a load from the occupant P acts on the cushion airbag 54. Since a part of the airbag cover 55 is hung on the hook part 68, the airbag cover 55 is less likely to move. Thus, the airbag cover 55 can be restrained from shifting from its original position.

In addition, in the vehicle seat 20, a part of the airbag cover 55 is hung on the hook part 68 and thereby mounted on the front panel 62. Thus, mounting a part of the airbag cover 55 to the front panel 62 does not require any other member, and therefore a part of the airbag cover 55 can be mounted on the front panel 62 by a simple configuration.

In the vehicle seat 20, the bracket 76 and the bag retainer 58 are fastened together by the bolt 82 and the nut 84. Thus, a load acting on the bag retainer 58 is transmitted from the bag retainer 58 to the submarine bar 52 through the bolt 82, the nut 84, and the bracket 76. Since the submarine bar 52 and the bag retainer 58 need not be directly fastened together, restrictions on the shape and arrangement of the submarine bar 52 can be reduced.

First Modified Example

Figure 6:
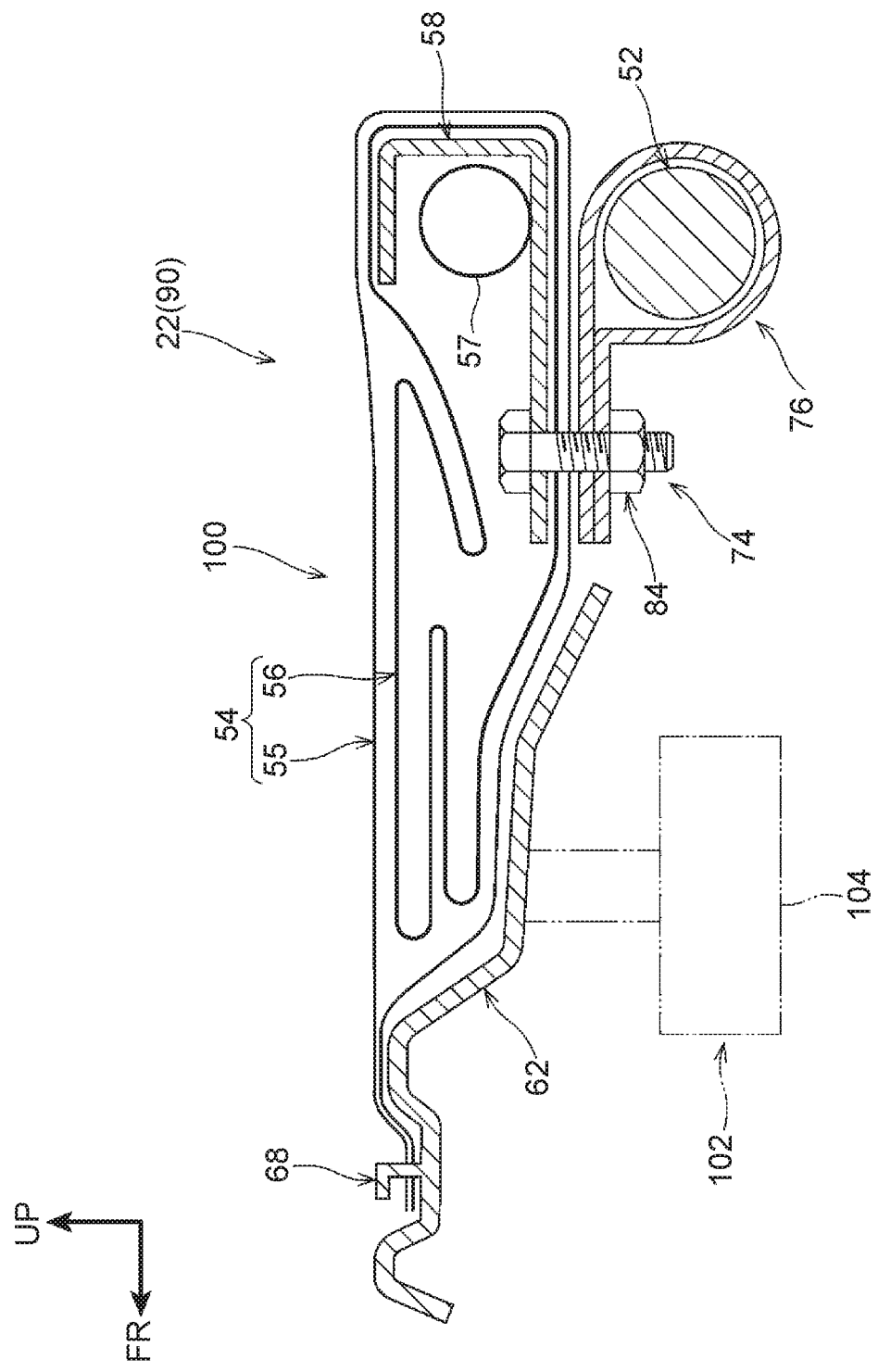
FIG. 6 is a vertical sectional view showing a configuration inside a seat cushion of a vehicle seat according to a first modified example of the first embodiment.

FIG. 6 shows a vehicle seat 90 as a first modified example of the vehicle seat 20 of the first embodiment. The vehicle seat 90 is provided in the vehicle 10 (see FIG. 1), in place of the vehicle seat 20 (see FIG. 1). Those components that are basically the same as in the vehicle seat 20 of the first embodiment will be denoted by the same reference signs and the description thereof will be omitted. In FIG. 6, only main parts of the vehicle seat 90 are shown.

The vehicle seat 90 is different from the first embodiment in that the airbag mounting structure 50 (see FIG. 3) of the vehicle seat 20 is replaced with an airbag mounting structure 100. The airbag mounting structure 100 is different from the first embodiment in that the tilting mechanism 70 of the airbag mounting structure 50 is replaced with a lifting mechanism 102. The submarine bar 52 does not rotate, and the seat frame 30 does not move upward and downward. Only the front panel 62 moves upward and downward.

The lifting mechanism 102 includes a pair of left and right link members and a lifting gear (neither is shown), and a motor 104 that turns the link members through the lifting gear. Lower end portions of the link members are turnably coupled to the floor panel 12 (see FIG. 1). Upper end portions of the link members are turnably coupled to a lower surface of the front panel 62. A rotating action of the motor 104 is controlled by the control unit 72 (see FIG. 1). As the motor 104 is rotated, the pair of left and right link members are turned and the front panel 62 (a part of the seat cushion 22) is shifted in the up-down direction. The angle of the front panel 62 relative to the front-rear direction remains substantially the same regardless of whether the motor 104 is activated or not.

Figure 7:
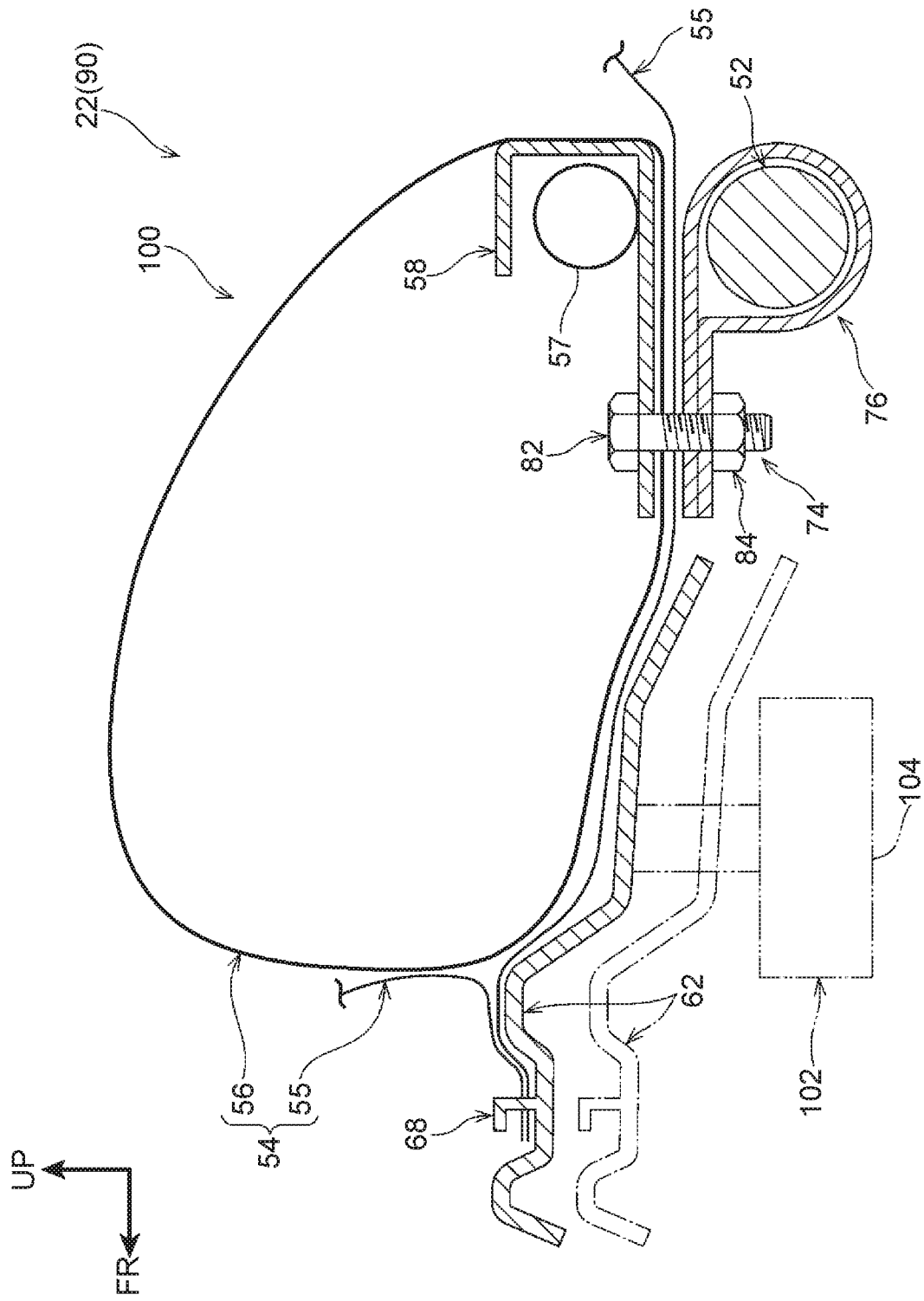
FIG. 7 is a vertical sectional view showing a state where an airbag main body of the vehicle seat shown in FIG. 6 is inflated and deployed.

As shown in FIG. 7, in the vehicle seat 90, the entire front panel 62 is moved upward when the lifting mechanism 102 is activated. Thus, a front part and a central part of the cushion airbag 54 are moved upward. When a frontal collision of the vehicle 10 occurs, the airbag main body 56 inflates and deploys. In the vehicle seat 90, the airbag main body 56 is restrained from deforming frontward by the same workings as in the vehicle seat 20, and therefore the occupant P can be restrained from moving frontward by inertia in a frontal collision of the vehicle 10.

Second Embodiment

Next, a vehicle seat 110 according to a second embodiment will be described.

Figure 8:
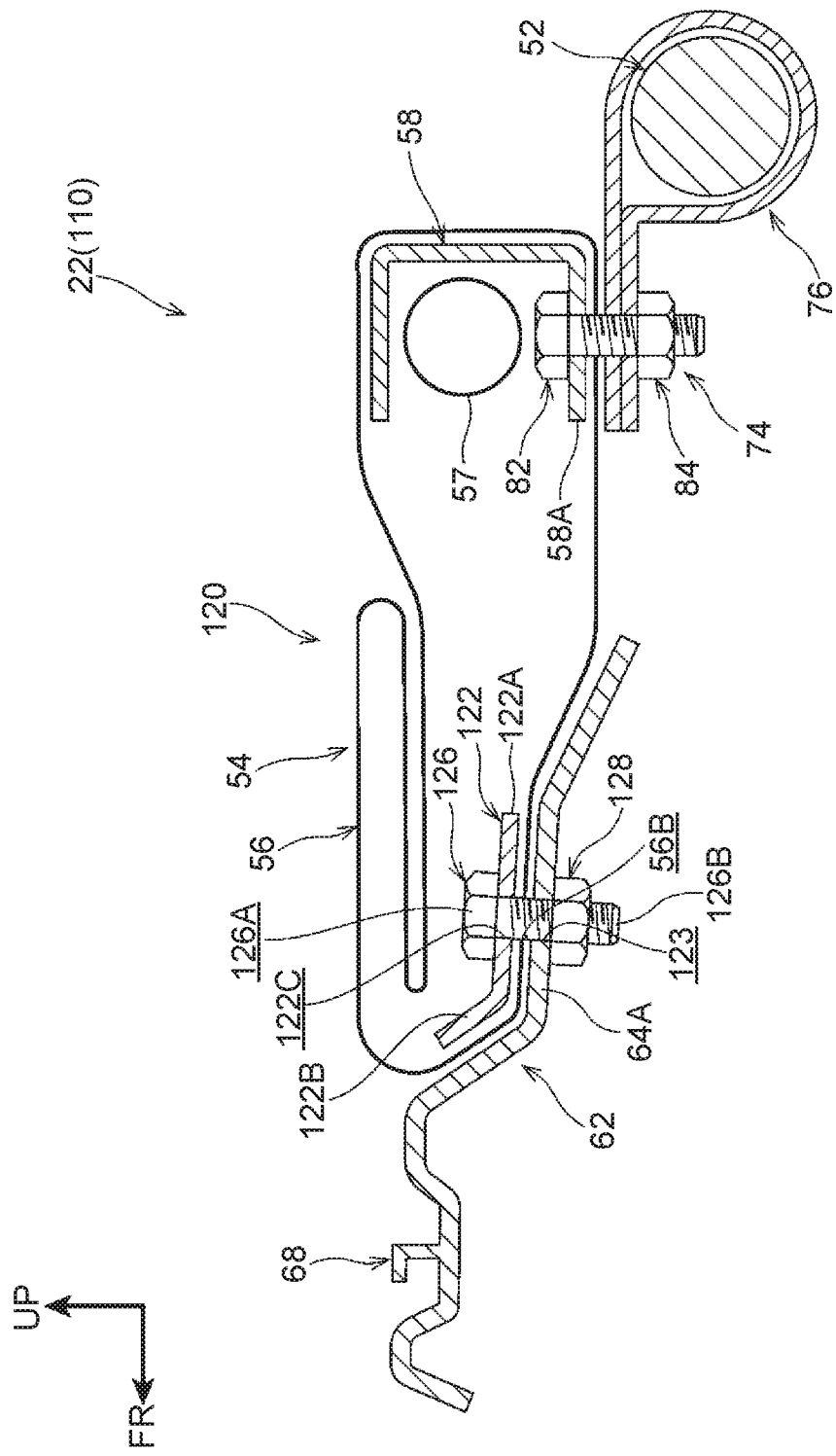
FIG. 8 is a vertical sectional view showing a configuration inside a seat cushion of a vehicle seat according to a second embodiment.

The vehicle seat 110 shown in FIG. 8 is provided in the vehicle 10 (see FIG. 1), in place of the vehicle seat 20 of the first embodiment (see FIG. 1). Those components that are basically the same as in the vehicle seat 20 of the first embodiment will be denoted by the same reference signs and the description thereof will be omitted. In FIG. 8, only main parts of the vehicle seat 110 are shown.

The vehicle seat 110 is different from the first embodiment in that the airbag mounting structure 50 (see FIG. 3) of the vehicle seat 20 is replaced with an airbag mounting structure 120. The airbag mounting structure 120 is different from the airbag mounting structure 50 in that it has a front retainer 122, a bolt 126, and a nut 128.

A through-hole 123 extending through the inclined wall 64A of the front panel 62 in a thickness direction as an example of the mount part is formed in the inclined wall 64A. The front retainer 122, the bolt 126, and the nut 128 are an example of the mounting member. The length of the bottom plate 58A in the front-rear direction in the second embodiment is, for example, shorter than the length of the bottom plate 58A in the front-rear direction in the first embodiment. While the hook part 68 is formed on the front panel 62 in FIG. 8, the hook part 68 may be omitted from the vehicle seat 110.

The cushion airbag 54, for example, does not have the airbag cover 55 (see FIG. 3) and is composed only of the airbag main body 56. A through-hole 56B is formed at a portion of the airbag main body 56 that is disposed above the front panel 62. The through-hole 56B and the through-hole 123 coincide with each other in the up-down direction. The airbag main body 56 is housed on the lower side of the cushion pad 42 (see FIG. 3) in a folded state. Further, the inflator 57, the front retainer 122, and the bag retainer 58 are disposed inside the airbag main body 56.

Front Retainer

The front retainer 122 is formed, for example, by bending a steel plate. The front retainer 122 is disposed (housed) on the upper side of the front panel 62, on the front side of the center of the inside of the airbag main body 56 in the front-rear direction. Specifically, the front retainer 122 is provided inside the airbag main body 56, on the front side of the bag retainer 58. As seen in a side view, the front retainer 122 has a bottom plate 122A extending in the front-rear direction, and a flange 122B extending from a front end of the bottom plate 122A toward an obliquely upper side.

In the width direction, the length of each of the bottom plate 122A and the flange 122B is substantially equal to the length of the bottom plate 58A. A through-hole 122C extending through the bottom plate 122A in a thickness direction is formed at a central portion of the bottom plate 122A in the front-rear direction. A part (bottom part) of the airbag main body 56 is disposed on the lower side relative to the bottom plate 122A and the flange 122B. Here, the through-hole 122C, the through-hole 56B, and the through-hole 123 coincide with one another in the up-down direction.

Bolt and Nut

The bolt 126 has a head 126A and a shaft 126B. The head 126A is welded to an upper surface of the bottom plate 122A. The shaft 126B has a substantially columnar shape, and extends downward from the head 126A with an axial direction oriented in the up-down direction. An external thread is formed on an outer circumferential surface of the shaft 126B. The shaft 126B is inserted into the through-hole 122C, the through-hole 56B, and the through-hole 123 from the upper side toward the lower side, and extends downward beyond the inclined wall 64A. The nut 128 is screwed on the shaft 126B from below the inclined wall 64A, so that the front retainer 122 and the front panel 62 are fastened together. A part of the airbag main body 56 is mounted on a circumferential edge portion of the through-hole 123 by the front retainer 122, the bolt 126, and the nut 128.

Workings and Effects

Next, the workings of the vehicle seat 110 of the second embodiment will be described.

Figure 9:
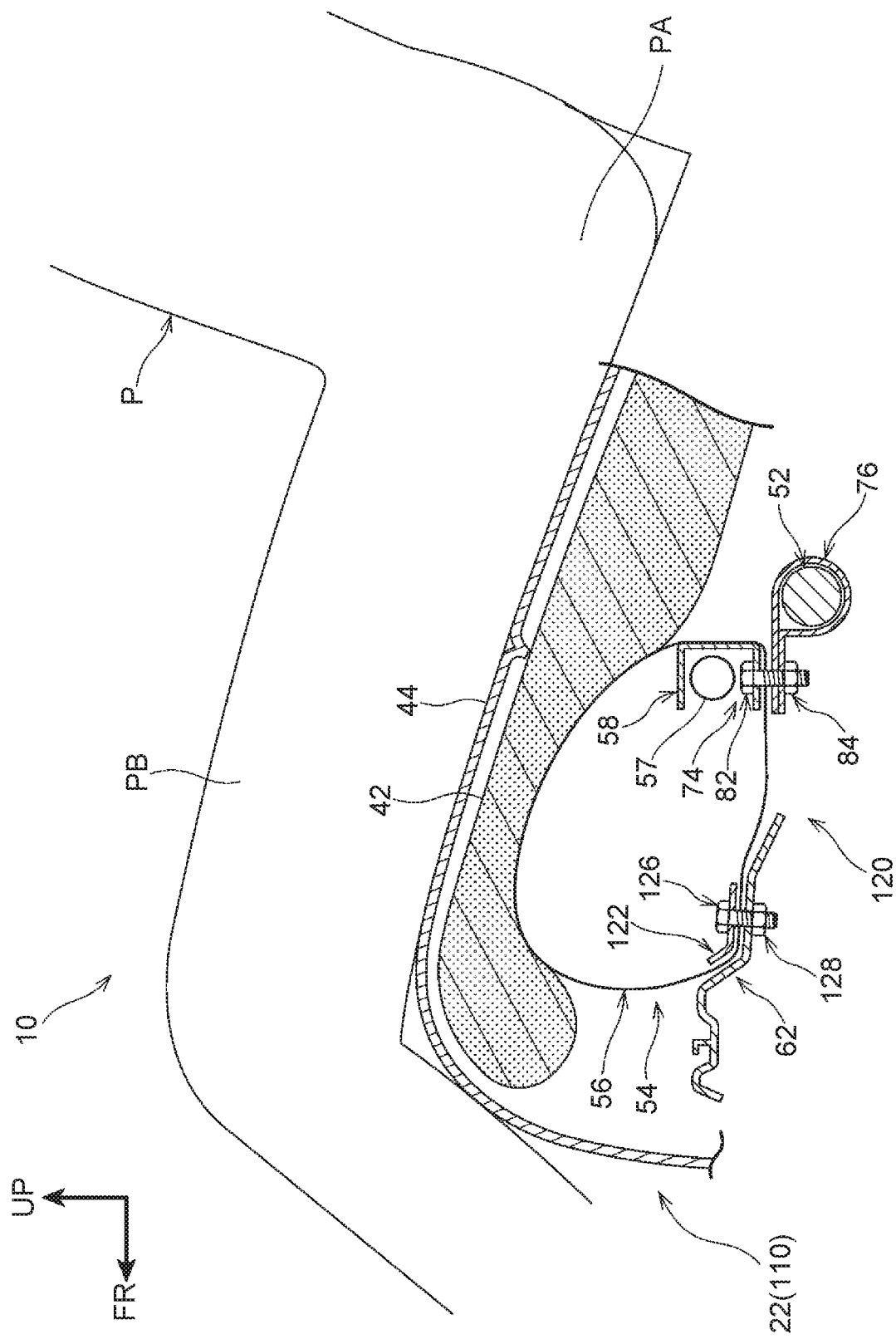
FIG. 9 is a vertical sectional view showing a state where an airbag main body of the vehicle seat shown in FIG. 8 is inflated and deployed.

In the vehicle seat 110 shown in FIG. 9, the airbag main body 56 is held between the front panel 62 and the front retainer 122. Thus, when a part of the airbag main body 56 is moved upward, this movement of the airbag main body 56 is limited by the front retainer 122, the bolt 126, and the nut 128. As a result, the airbag main body 56 can be restrained from partially lifting off the front panel 62. As movement of the airbag main body 56 is limited, the airbag main body 56 can be restrained from swinging when inflating and deploying. Further, as the airbag main body 56 is restrained from swinging, tearing of the seat skin 44 can be avoided. The other workings of the vehicle seat 110 are the same as those of the vehicle seat 20 (see FIG. 1) and therefore the description thereof will be omitted.

Third Embodiment

Next, a vehicle seat 130 according to a third embodiment will be described.

Figure 10:
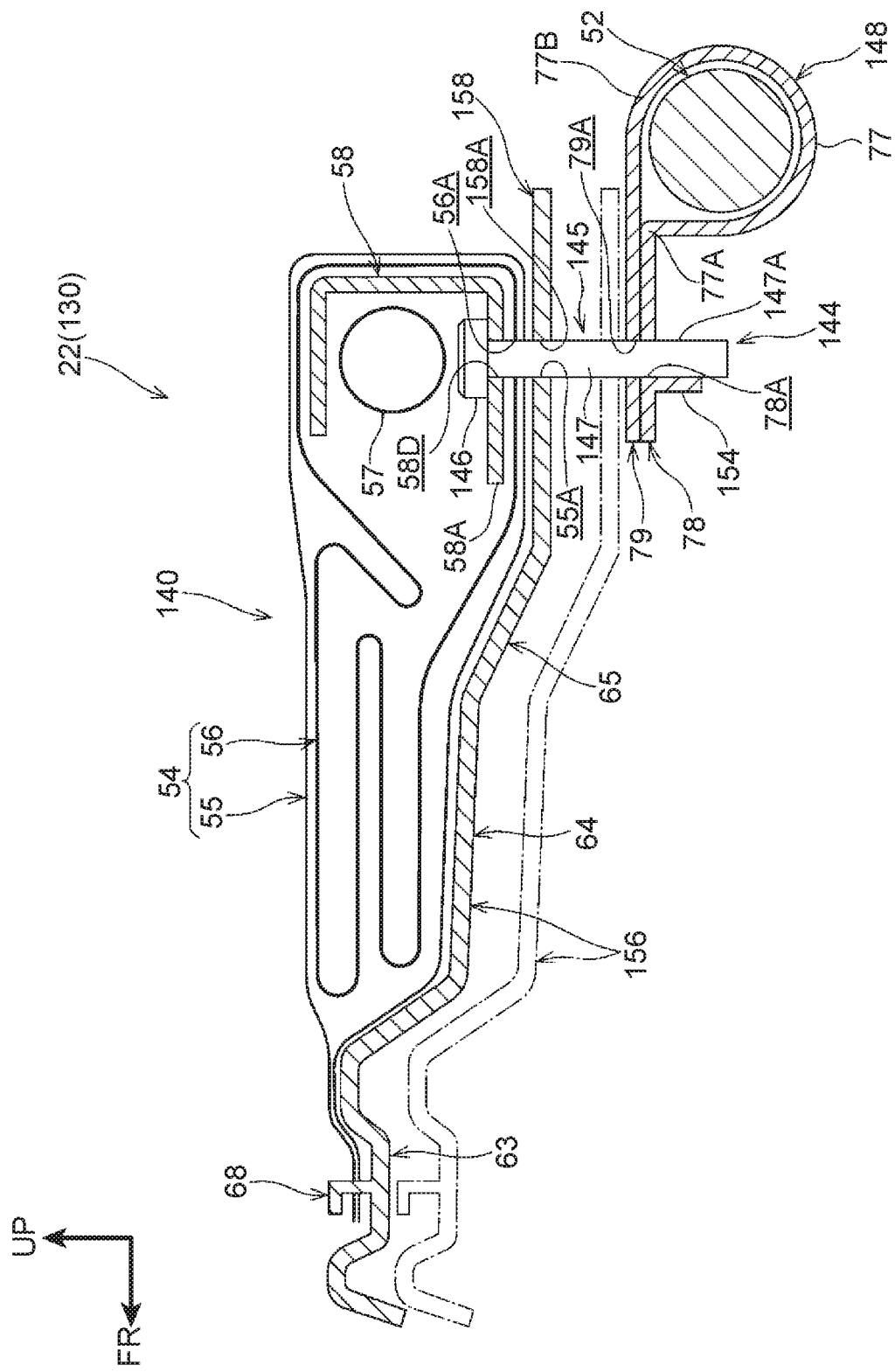
FIG. 10 is a vertical sectional view showing a configuration inside a seat cushion of a vehicle seat according to a third embodiment.

The vehicle seat 130 shown in FIG. 10 is provided in the vehicle 10 (see FIG. 1), in place of the vehicle seat 20 of the first embodiment (see FIG. 1). Those components that are basically the same as in the vehicle seat 20 or the vehicle seat 90 will be denoted by the same reference signs and the description thereof will be omitted. In FIG. 10, only main parts of the vehicle seat 130 are shown.

The vehicle seat 130 is different from the first embodiment in that the airbag mounting structure 50 (see FIG. 3) of the vehicle seat 20 is replaced with an airbag mounting structure 140. The airbag mounting structure 140 is different from the first embodiment in that the transmission member 74, the front panel 62, and the tilting mechanism 70 (see FIG. 3) are replaced with a transmission member 144, a front panel 156 as an example of the panel member, and the lifting mechanism 102 (see FIG. 6).

Transmission Member

The transmission member 144 has a protruding member 145 protruding from the bag retainer 58 toward an outside of the cushion airbag 54, and a fixed member 148 fixed to the submarine bar 52.

Protruding Member

The protruding member 145 has a head 146 and a shaft 147. The head 146 is welded to the upper surface of the bottom plate 58A. The shaft 147 has a columnar shape and extends downward from the head 146 with an axial direction oriented in the up-down direction. The shaft 147 is an example of a part of the protruding member 145, and has an outer circumferential surface 147A. The shaft 147 is inserted into the through-hole 58D, the through-hole 56A, and the through-hole 55A from the upper side toward the lower side, and protrudes downward beyond the airbag main body 56 and the airbag cover 55.

Fixed Member

The fixed member 148 is disposed on the rear side relative to the bracket 76 (see FIG. 3), with a front end portion thereof disposed on the rear side relative to a front end of the bottom plate 58A. The fixed member 148 has substantially the same configuration as the bracket 76 (see FIG. 3), but is different from the bracket 76 in that a guide part 154 is formed at a part (front part) of a circumferential edge of the through-hole 78A.

The guide part 154 extends downward from the lower plate 78. As seen in a bottom view, the guide part 154 has a side surface (curved surface) extending along a hole wall surface of the through-hole 78A. The through-hole 78A and the through-hole 79A are an example of the insertion part, and have such an inside diameter that a gap is left between the through-holes 78A, 79A and the outer circumferential surface 147A. The shaft 147 is inserted into the through-hole 78A and the through-hole 79A so as to be movable in the up-down direction.

Front Panel

The front panel 156 is configured as a member that is formed by adding a flat part 158 to the front panel 62 (see FIG. 3). The front panel 156 is raised and lowered in the seat up-down direction by the lifting mechanism 102 (see FIG. 6).

The flat part 158 has a plate shape equal in thickness to the rear part 65, and extends rearward from the rear part 65 with a thickness direction oriented in the up-down direction. The flat part 158 is disposed so as to face the upper plate 79 in the up-down direction. A through-hole 158A extending through the flat part 158 in the thickness direction is formed in the flat part 158. The through-hole 158A has such a size that the shaft 147 can be inserted into the through-hole 158A so as to be movable in the up-down direction.

The shaft 147 is inserted into the through-hole 58D, the through-hole 56A, the through-hole 55A, the through-hole 158A, the through-hole 79A, and the through-hole 78A from the upper side toward the lower side, and protrudes downward beyond the lower plate 78. The shaft 147 is movable in the front-rear direction and the width direction relatively to the front panel 156, the lower plate 78, and the upper plate 79. The length of the shaft 147 in the up-down direction is set such that the shaft 147 does not slip out of the through-hole 58D, the through-hole 56A, the through-hole 55A, the through-hole 158A, the through-hole 79A, and the through-hole 78A when the front panel 156 is raised or lowered by the lifting mechanism 102.

A load that acts on the bag retainer 58 when the airbag main body 56 inflates and deploys in a state where the shaft 147 is in contact with the lower plate 78 and the upper plate 79 is transmitted to the submarine bar 52 through the shaft 147 and the fixed member 148. Thus, the transmission member 144 transmits a load acting on the bag retainer 58 to the submarine bar 52.

Workings and Effects

Next, the workings of the vehicle seat 130 of the third embodiment will be described.

Figure 11:
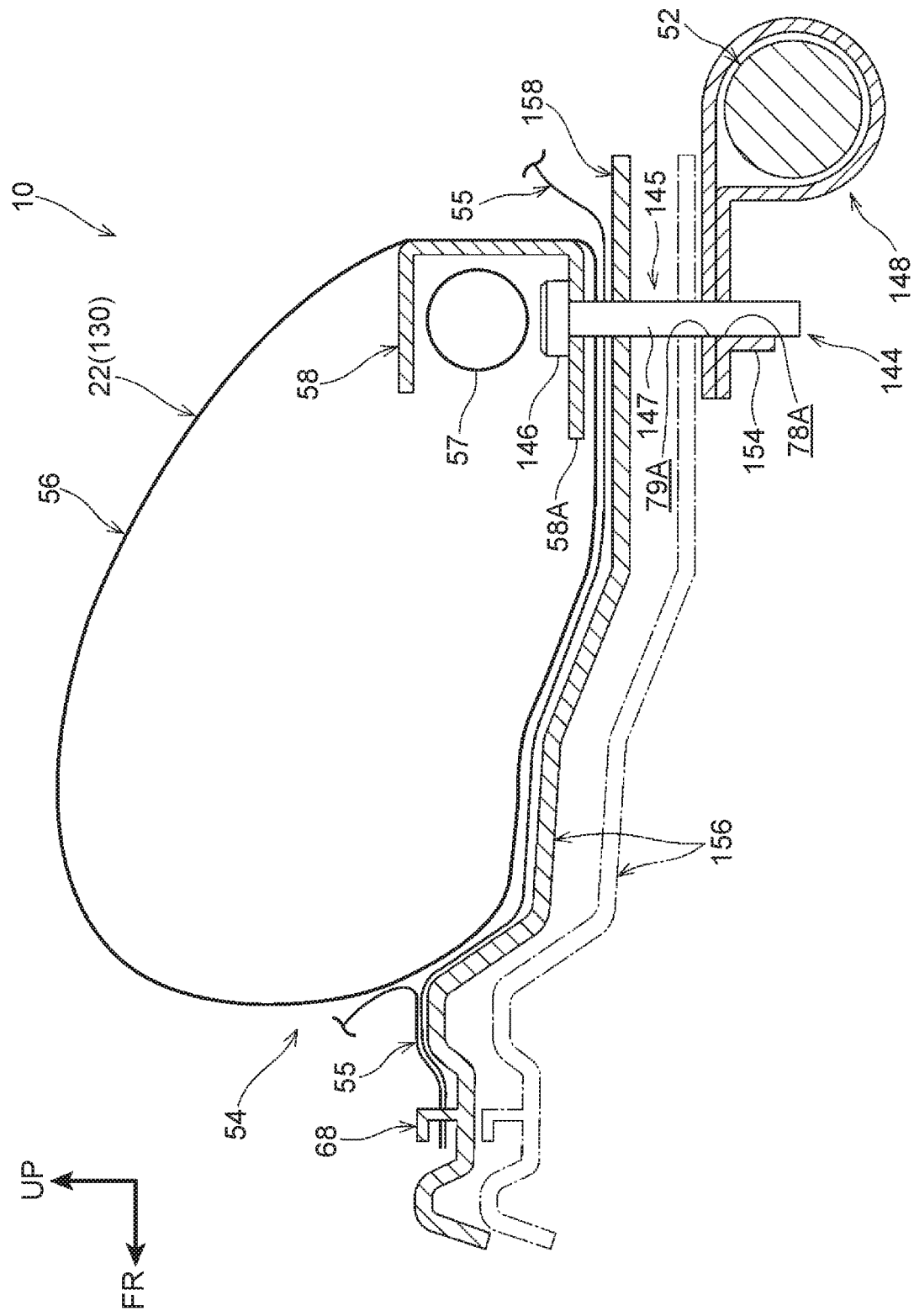
FIG. 11 is a vertical sectional view showing a state where an airbag main body of the vehicle seat shown in FIG. 10 is inflated and deployed.

In the vehicle seat 130 shown in FIG. 11, the shaft 147 is inserted in the through-hole 78A and the through-hole 79A so as to be relatively movable. Thus, when a part of the seat cushion 22 (see FIG. 2) is shifted in the up-down direction by the lifting mechanism 102 (see FIG. 6), the airbag main body 56 is allowed to shift according to the shift of the seat cushion 22 while the load transmitting function is maintained. This can increase the flexibility of the installation position of the airbag main body 56 in the seat cushion 22.

Moreover, in the vehicle seat 130, when a frontal collision of the vehicle 10 occurs, a load directed frontward acts from the occupant P on the inflated and deployed airbag main body 56, so that the airbag main body 56 and the bag retainer 58 come into contact with each other and the bag retainer 58 is shifted frontward. As a result of this shift of the bag retainer 58, the shaft 147 comes into contact with the hole walls (including the guide part 154) of the through-hole 78A and the through-hole 79A, and the load is thereby transmitted from the bag retainer 58 to the submarine bar 52 through the fixed member 148. Thus, simply inserting the shaft 147 into the through-hole 78A and the through-hole 79A makes it possible to transmit a load to the submarine bar 52. This configuration can increase the efficiency of assembling the transmission member 144 compared with one in which the shaft 147 is press-fitted into the through-hole 78A and the through-hole 79A. The other workings of the vehicle seat 130 are the same as those of the vehicle seat 20 (see FIG. 1) and therefore the description thereof will be omitted.

Fourth Embodiment

Next, a vehicle seat 160 according to a fourth embodiment will be described.

Figure 12:
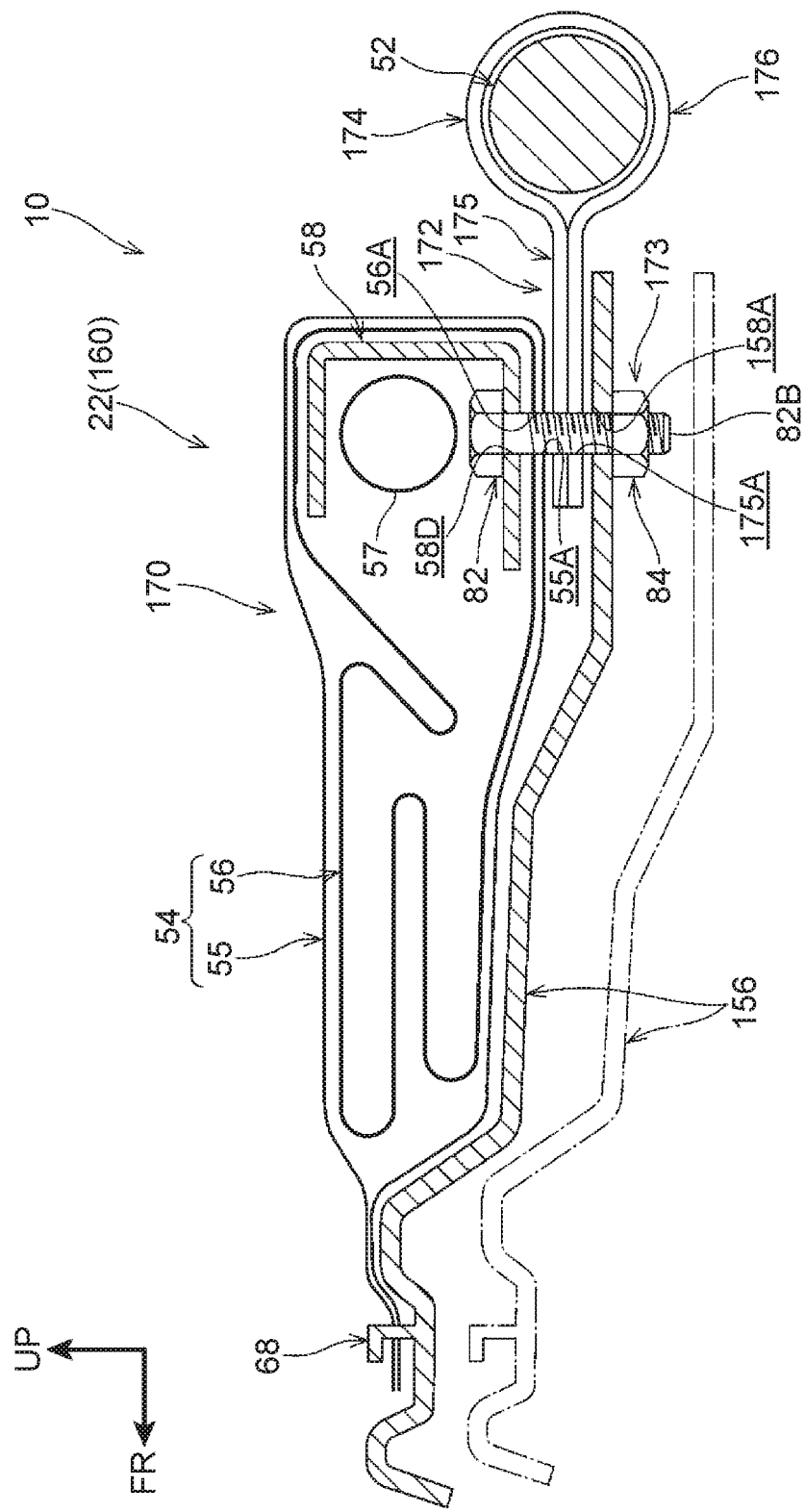
FIG. 12 is a vertical sectional view showing a configuration inside a seat cushion of a vehicle seat according to a fourth embodiment.

The vehicle seat 160 shown in FIG. 12 is provided in the vehicle 10 (see FIG. 11), in place of the vehicle seat 130 of the third embodiment (see FIG. 11). Those components that are basically the same as in the vehicle seat 130 of the third embodiment will be denoted by the same reference signs and the description thereof will be omitted. In FIG. 12, only main parts of the vehicle seat 160 are shown.

The vehicle seat 160 is different from the third embodiment in that the airbag mounting structure 140 (see FIG. 10) of the vehicle seat 130 is replaced with an airbag mounting structure 170. The airbag mounting structure 170 is different from the airbag mounting structure 140 in that it has a transmission member 172.

Transmission Member

The transmission member 172 has a protruding member 173 protruding from the bag retainer 58 toward the outside of the cushion airbag 54, and a strap 174 as an example of the fabric member that is wrapped around the submarine bar 52.

Protruding Member

The protruding member 173 is composed of, for example, the bolt 82 and the nut 84. The strap 174 to be described later is provided on the shaft 82B of the bolt 82. A plurality of protruding members 173 is provided at intervals in the width direction.

Strap

The strap 174 is made of, for example, a fabric containing nylon fibers. As seen in a side view, the strap 174 has an extended part 175 extended in the front-rear direction and a tubular part 176 wrapped around the submarine bar 52. The length of the strap 174 in the width direction is, for example, substantially equal to the length of the bag retainer 58 in the width direction.

The extended part 175 is disposed on the lower side of the bag retainer 58 and has a plate shape with a thickness direction oriented in the up-down direction. The extended part 175 is held between the airbag cover 55 and the front panel 156 in the seat up-down direction. A plurality of through-holes 175A extending through the extended part 175 in the thickness direction is formed in the extended part 175 at intervals in the width direction. The shaft 82B is inserted in the through-hole 175A.

The tubular part 176 has a tubular shape with an axial direction oriented in the width direction. The submarine bar 52 is inserted inside the tubular part 176. A portion of the tubular part 176 in a circumferential direction is wrapped around a part of the outer circumferential surface of the submarine bar 52. In a state of the vehicle 10 before a frontal collision, the submarine bar 52 and the tubular part 176 need not be in contact with each other. However, when a frontal collision of the vehicle 10 occurs, a portion of the tubular part 176 should be wrapped around the outer circumferential surface of the submarine bar 52.

The shaft 82B is inserted into the through-hole 58D, the through-hole 56A, the through-hole 55A, the through-hole 175A, and the through-hole 158A from the upper side toward the lower side, and is fastened with the nut 84. Since the strap 174 is made of fabric and the extended part 175 can shift upward and downward relatively to the tubular part 176, the strap 174 can be retained in a state of being wrapped around the submarine bar 52 even when the front panel 156 is raised or lowered by the lifting mechanism 102.

A load that acts on the bag retainer 58 in a state where the tubular part 176 and the submarine bar 52 are in contact with each other is transmitted to the submarine bar 52 through the shaft 82B and the strap 174. Thus, the transmission member 172 transmits a load acting on the bag retainer 58 to the submarine bar 52.

Workings and Effects

Next, the workings of the vehicle seat 160 of the fourth embodiment will be described.

Figure 13:
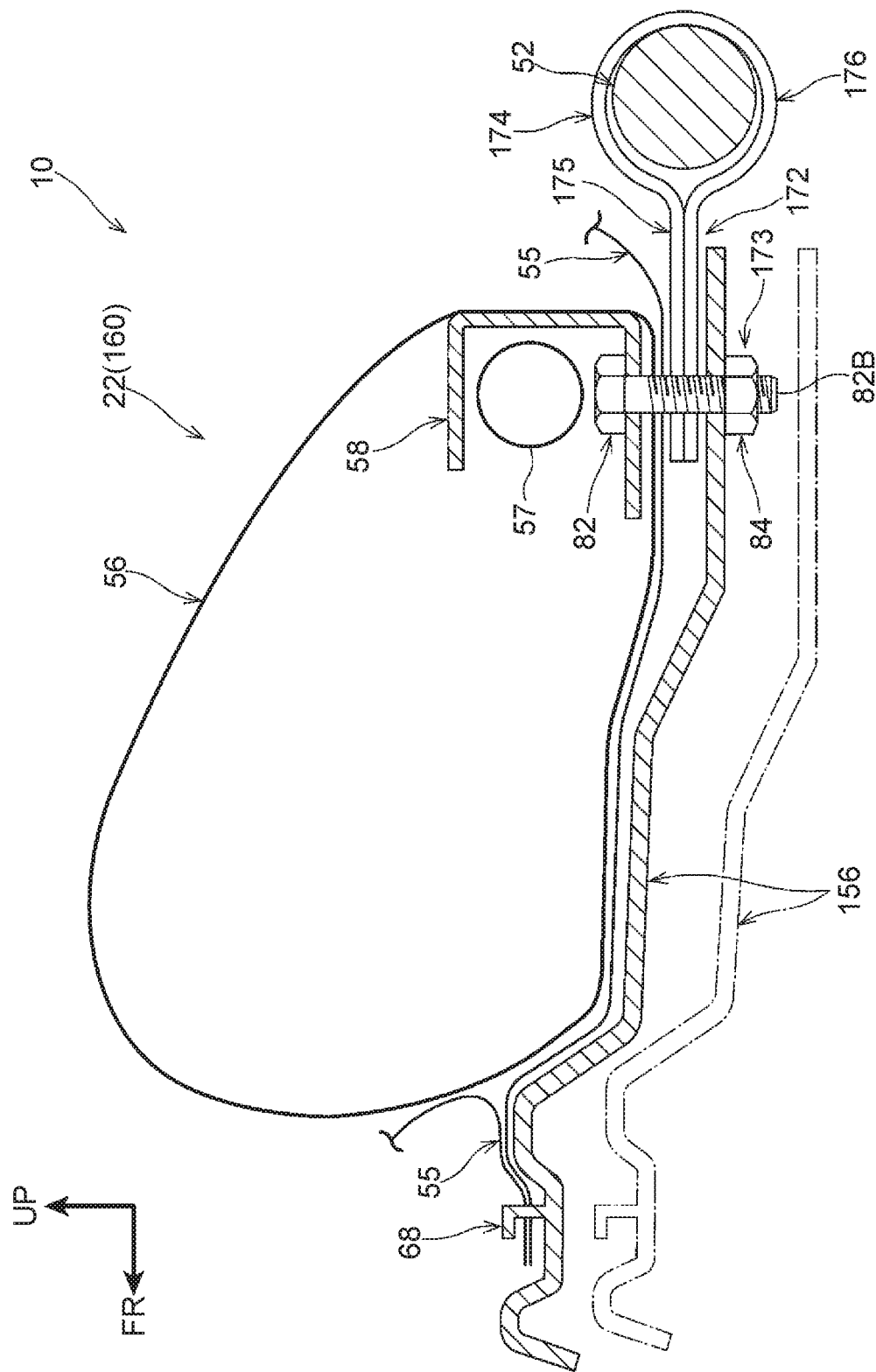
FIG. 13 is a vertical sectional view showing a state where an airbag main body of the vehicle seat shown in FIG. 12 is inflated and deployed.

In the vehicle seat 160 shown in FIG. 13, when a frontal collision of the vehicle 10 occurs, a load from the occupant P acts on the inflated and deployed airbag main body 56, so that the airbag main body 56, the inflator 57, and the bag retainer 58 are shifted frontward as one unit. As a result of this shift of the bag retainer 58, the protruding member 173 is shifted frontward and the strap 174 is pulled frontward, so that the strap 174 and the submarine bar 52 come into contact with each other. As a result, a pulling force is exerted by the strap 174 on the submarine bar 52, and the load is transmitted from the bag retainer 58 to the submarine bar 52. Thus, wrapping the strap 174 provided on the protruding member 173 around the submarine bar 52 makes it possible to transmit a load to the submarine bar 52. This configuration can reduce the weight of the vehicle seat 160 compared with one in which a metal transmission member is fixed to the submarine bar 52. The other workings of the vehicle seat 160 are the same as those of the vehicle seat 130 (see FIG. 10) and therefore the description thereof will be omitted.

Fifth Embodiment

Next, a vehicle seat 180 according to the fifth embodiment will be described.

Figure 14:
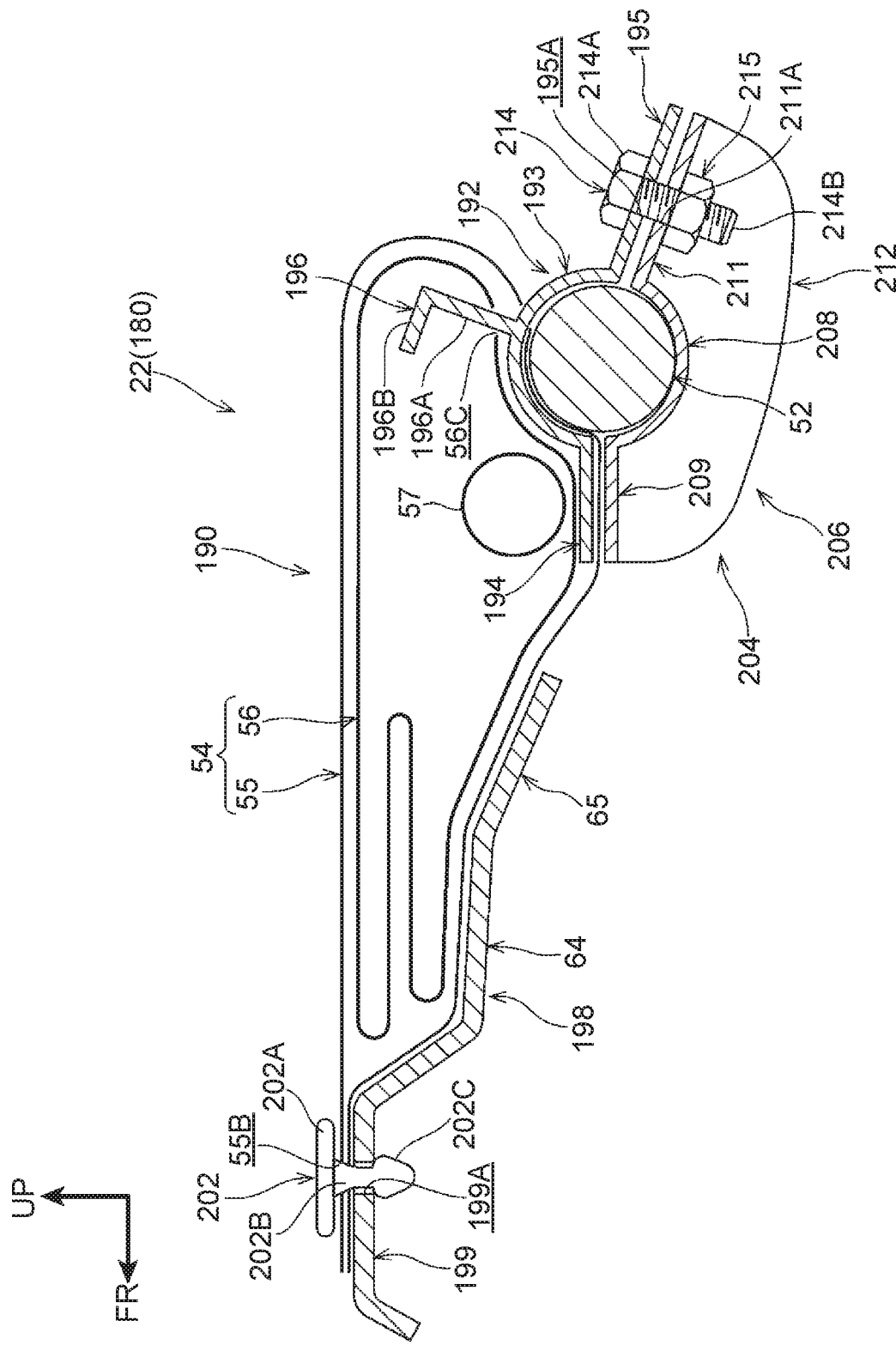
FIG. 14 is a vertical sectional view showing a configuration inside a seat cushion of a vehicle seat according to a fifth embodiment.

The vehicle seat 180 shown in FIG. 14 is provided in the vehicle 10 (see FIG. 1), in place of the vehicle seat 20 of the first embodiment (see FIG. 1). Those components that are basically the same as in the vehicle seat 20 of the first embodiment will be denoted by the same reference signs and the description thereof will be omitted. In FIG. 14, only main parts of the vehicle seat 180 are shown.

The vehicle seat 180 is different from the first embodiment in that the airbag mounting structure 50 (see FIG. 3) of the vehicle seat 20 is replaced with an airbag mounting structure 190. The airbag mounting structure 190 is different from the airbag mounting structure 50 in that it has a bag retainer 192 as an example of the retaining member, a transmission member 204, a front panel 198 as an example of the panel member, and a clip 202 as an example of the mounting member.

Bag Retainer

The bag retainer 192 is formed by, for example, a steel material. The bag retainer 192 is disposed on the upper side of the submarine bar 52 and a part thereof is housed inside the airbag main body 56. Specifically, as seen in a side view, the bag retainer 192 has a structure in which a base part 193, a front flange 194, a rear flange 195, and an input part 196 are integrated. The bag retainer 192 extends in the width direction.

The base part 193 is, for example, a part having a semi-cylindrical shape opening downward with an axial direction oriented in the width direction. The radius of curvature of the base part 193 is set such that an inner circumferential surface of the base part 193 can come into contact with the outer circumferential surface of the submarine bar 52 in a radial direction. As seen in a plan view, the base part 193 is large enough to cover the submarine bar 52.

The front flange 194 extends frontward from a front end of the base part 193. The front flange 194 has a plate shape with a thickness direction oriented in the up-down direction. The inflator 57 is mounted on the front flange 194 through a pin member (not shown) extending through a portion of the airbag main body 56. Thus, the front flange 194 retains the inflator 57.

The rear flange 195 extends in a plate shape from a rear end of the base part 193 toward a rear lower side. A through-hole 195A extending through the rear flange 195 in a thickness direction is formed at a portion of the rear flange 195.

As seen in a side view, the input part 196 has a structure in which an inclined part 196A extending obliquely from a substantially central portion of the base part 193 in a circumferential direction toward a radially outer side and the rear side, and an upper plate 196B extending from a leading end of the inclined part 196A toward a front upper side are integrated. A portion of the inclined part 196A and the upper plate 196B are disposed (housed) on a rear end side of the inside of the airbag main body 56 through a through-hole 56C formed in the airbag main body 56. The input part 196 is disposed on the rear side of the inflator 57. In the up-down direction, the position of the upper plate 196B is higher than the position of an upper end of the inflator 57.

Front Panel

The front panel 198 is different from the front panel 62 (see FIG. 3) in that the recess 66 is omitted from the front panel 62 and a part from the upper wall 63B to the upper wall 63F is one flat plate 199. A through-hole 199A as an example of the mount part is formed in the flat plate 199.

The through-hole 199A extends through the flat plate 199 in the up-down direction. A plurality of through-holes 199A is formed in the flat plate 199, at intervals in the width direction. The clip 202 to be described later is inserted into each through-hole 199A.

Transmission Member

The transmission member 204 has a bracket 206 provided on the submarine bar 52, and a bolt 214 and a weld nut 215 as an example of the fastening member that fastens together the bracket 206 and the bag retainer 192.

Bracket

The bracket 206 is made of, for example, a steel material. As seen in a side view, the bracket 206 is disposed on the lower side of the bag retainer 192. The length of the bracket 206 in the width direction is, for example, substantially equal to the length of the bag retainer 192 in the width direction. In FIG. 14, to clarify the arrangement of members, the members are shown with a gap left between each other although some members are actually in contact with each other.

As seen in a side view, the bracket 206 has a structure in which a base part 208, a front flange 209, a rear flange 211, and a vertical flange 212 are integrated. The base part 208, the front flange 209, and the rear flange 211 extend in the width direction.

The base part 208 is, for example, a part having a semi-cylindrical shape opening upward with an axial direction oriented in the width direction. The radius of curvature of the base part 208 is set such that an inner circumferential surface of the base part 208 can come into contact with the outer circumferential surface of the submarine bar 52 in a radial direction. As seen in a bottom view of the base part 208, the base part 208 is large enough to cover the submarine bar 52. A portion of the base part 208 is welded to the outer circumferential surface of the submarine bar 52.

The front flange 209 extends frontward from a front end of the base part 208. The front flange 209 has a plate shape with a thickness direction oriented in the up-down direction. The front flange 209 and the front flange 194 hold the bottom part of the airbag cover 55 therebetween in the seat up-down direction.

The rear flange 211 extends in a plate shape from a rear end of the base part 208 toward a rear lower side. A through-hole 211A extending through the rear flange 211 in a thickness direction is formed at a portion of the rear flange 211. The rear flange 195 and the rear flange 211 are placed one on top of the other substantially in the up-down direction.

The vertical flange 212 extends downward from both ends of each of the base part 208, the front flange 209, and the rear flange 211 in the width direction. Thus, as seen in a front view, the bracket 206 has a U-shape opening downward.

Bolt and Weld Nut

The weld nut 215 is placed over a circumferential edge portion of the through-hole 211A of the rear flange 211 from below and welded thereto. Thus, a hole of the weld nut 215 and the through-hole 211A coincide with each other.

The bolt 214 has a head 214A and a shaft 214B. The shaft 214B has a substantially columnar shape and has an external thread formed on an outer circumferential surface. The shaft 214B is inserted into the through-hole 195A and the through-hole 211A from the upper side toward the lower side, and the weld nut 215 is screwed on the shaft 214B. Thus, the bag retainer 192 and the bracket 206 are fastened together. A load that acts on the bag retainer 192 when the airbag main body 56 inflates and deploys is transmitted to the submarine bar 52 through the bolt 214 and the bracket 206. Thus, the transmission member 204 transmits a load acting on the bag retainer 192 to the submarine bar 52.

To assemble the vehicle seat 180, the rear flange 195 is placed from above onto the rear flange 211 of the bracket 206 welded to the submarine bar 52. Then, the bolt 214 is screwed into the weld nut 215 from above, so that the rear flange 211 and the rear flange 195 are fastened together. Thus, the bag retainer 192 can be mounted by working on the submarine bar 52 from above.

Clip

The clip 202 is formed, for example, as a resin member. The clip 202 has a circular flat plate 202A, a columnar shaft 202B extending downward from the flat plate 202A, and a wide part 202C formed on a leading end side of the shaft 202B.

The outside diameter of the flat plate 202A is larger than the inside diameter of the through-hole 199A. The outside diameter of the shaft 202B is smaller than the inside diameter of the through-hole 199A. The maximum outside diameter of the wide part 202C is larger than the inside diameter of the through-hole 199A. However, since the wide part 202C is made of resin, when pressed into the through-hole 199A, the wide part 202C can deform elastically and pass through the through-hole 199A.

In a state where the through-hole 55B and the through-hole 199A coincide with each other, the wide part 202C and the shaft 202B are inserted into the through-hole 55B and the through-hole 199A from the upper side toward the lower side, and the front part of the airbag cover 55 is thereby mounted on the front panel 198. Thus, the clip 202 by which a part of the cushion airbag 54 is mounted on a circumferential edge portion of the through-hole 199A is provided inside the cushion airbag 54, on the front side of the bag retainer 192.

A part from the bag retainer 192 to the submarine bar 52 is one unit. Therefore, when the front panel 198 is turned as the tilting mechanism 70 (see FIG. 1) is activated, and the inclination of the cushion airbag 54 relative to the front-rear direction changes, the submarine bar 52 is turned and the bracket 206 and the bag retainer 192 are inclined. Thus, as the angle of the front panel 198 changes, the angles of the bracket 206 and the bag retainer 192 also change, so that a situation where the front part and the rear part of the cushion airbag 54 are disposed at different levels in the up-down direction is avoided. This means that when the seat cushion 22 is inclined, a change in the state of arrangement of the airbag main body 56 relative to the occupant P (see FIG. 2) is avoided.

Workings and Effects

Next, the workings of the vehicle seat 180 of the fifth embodiment will be described.

When the vehicle 10 is driving autonomously, the occupant P sitting in the vehicle seat 180 may change his or her posture from a normal posture to a resting posture or a comfortable posture by manipulating the reclining mechanism (not shown).

Figure 15:
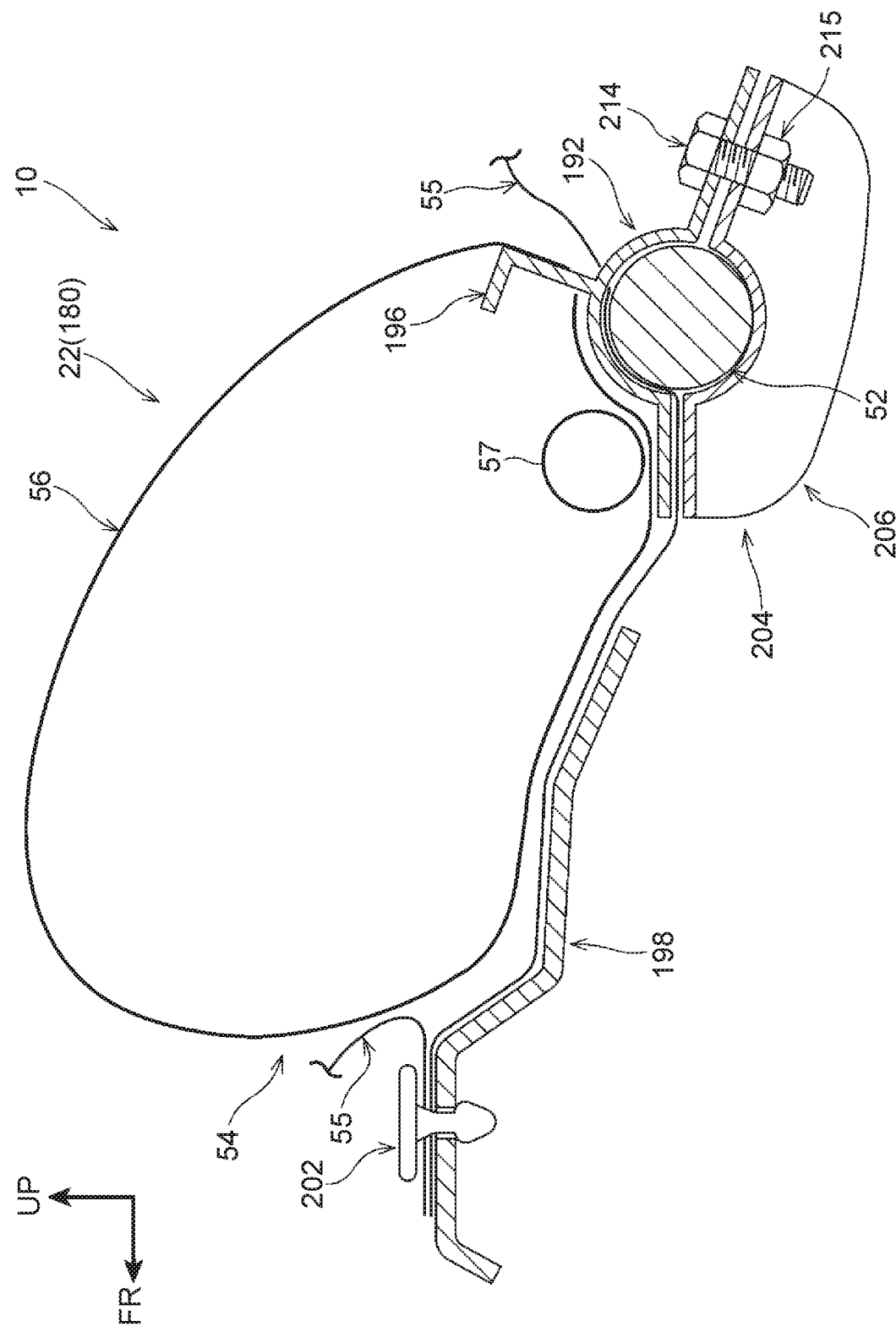
FIG. 15 is a vertical sectional view showing a state where an airbag main body of the vehicle seat shown in FIG. 14 is inflated and deployed.

In such a case, as shown in FIG. 15, when a frontal collision of the vehicle 10 occurs, the airbag main body 56 inflates and deploys upon being supplied with gas from the inflator 57 in the vehicle seat 180. Meanwhile, the occupant P (see FIG. 2) sitting in the vehicle seat 180 moves frontward from the original sitting position by inertia. Thus, a load directed frontward acts from the occupant P on the inflated and deployed airbag main body 56. As this load acts on the airbag main body 56, the airbag main body 56 is deformed and the rear part thereof comes into contact with the bag retainer 192 (input part 196), provided inside the airbag main body 56, in the front-rear direction. This means that the load is transmitted from the airbag main body 56 to the bag retainer 192.

The load having been transmitted to the bag retainer 192 is transmitted to the submarine bar 52 through the transmission member 204. Thus, the load acting on the airbag main body 56 is reduced, and the airbag main body 56 is restrained from deforming frontward. As the airbag main body 56 is restrained from deforming, a decrease in the reaction force that the occupant P receives from the airbag main body 56 is avoided. Therefore, the occupant P can be restrained from moving frontward by inertia in a frontal collision of the vehicle 10. In other words, the aforementioned submarine phenomenon can be avoided.

In the vehicle seat 180, the cushion airbag 54 (airbag cover 55) is held between the front panel 198 and the clip 202. Thus, when a part (front part) of the airbag cover 55 is moved upward, this movement of the airbag cover 55 is limited by the clip 202, so that the airbag cover 55 can be restrained from partially lifting off the front panel 198. The other workings of the vehicle seat 180 are the same as those of the vehicle seat 20 (see FIG. 1) and therefore the description thereof will be omitted.

Sixth Embodiment

Next, a vehicle seat 220 according to a sixth embodiment will be described.

Figure 16:
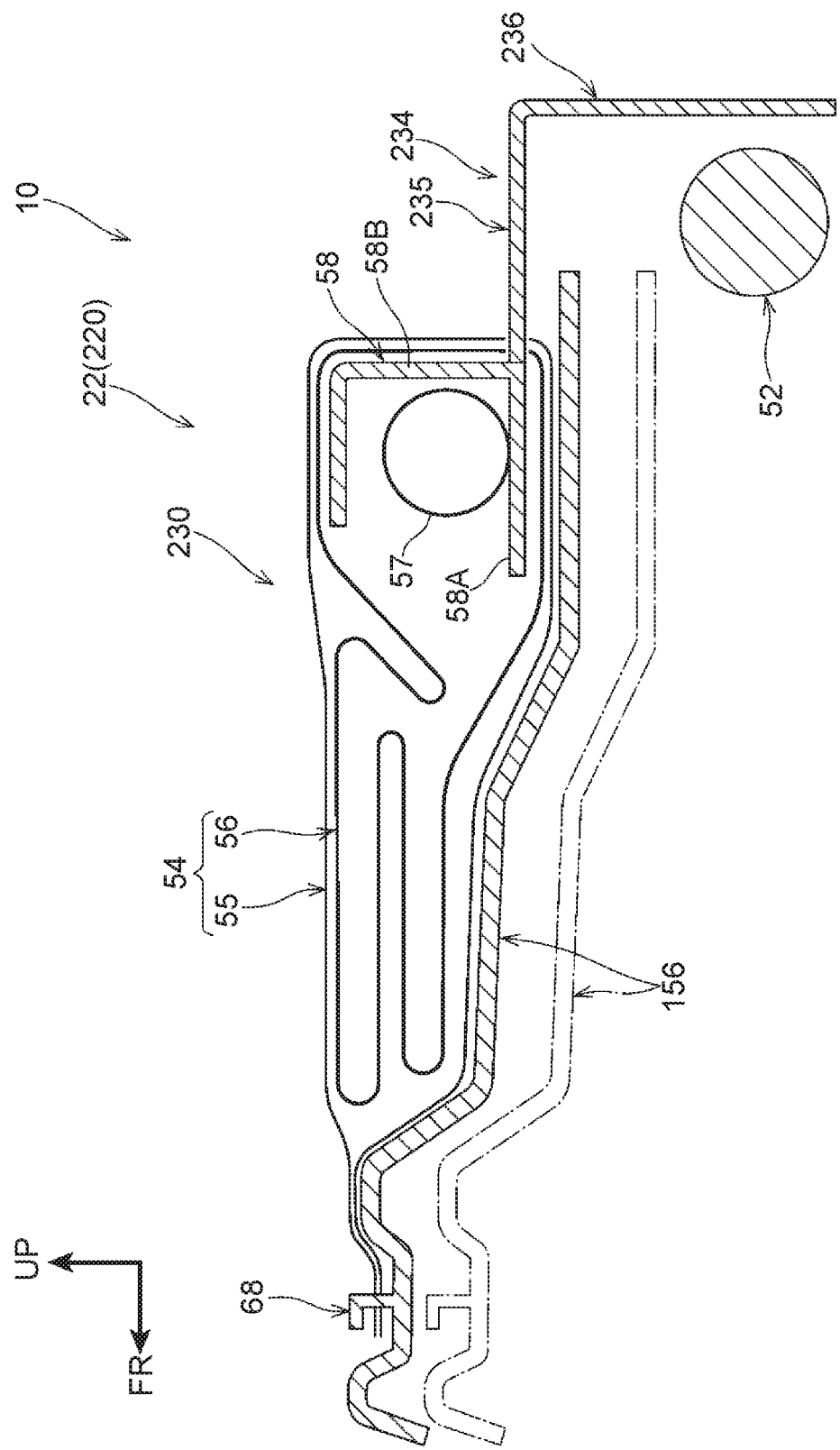
FIG. 16 is a vertical sectional view showing a configuration inside a seat cushion of a vehicle seat according to a sixth embodiment.

The vehicle seat 220 shown in FIG. 16 is provided in the vehicle 10 (see FIG. 12), in place of the vehicle seat 160 of the fourth embodiment (see FIG. 12). Those components that are basically the same as in the vehicle seat 160 of the fourth embodiment will be denoted by the same reference signs and the description thereof will be omitted. In FIG. 16, only main parts of the vehicle seat 220 are shown.

The vehicle seat 220 is different from the fourth embodiment in that the airbag mounting structure 170 (see FIG. 3) of the vehicle seat 160 is replaced with an airbag mounting structure 230. The airbag mounting structure 230 is different from the airbag mounting structure 170 in that it has a transmission member 234 in place of the transmission member 172.

The length of the bottom plate 58A in the front-rear direction in the sixth embodiment is similar to the length of the bottom plate 58A in the front-rear direction in the fourth embodiment. The bottom plate 58A does not have a through-hole. Except for the through-hole, the configuration of the bag retainer 58 is the same as in the fourth embodiment.

Transmission Member

The transmission member 234 is formed by, for example, a steel plate, and is welded to the bag retainer 58. Specifically, as seen in a side view, the transmission member 234 has a horizontal plate 235 extending in the front-rear direction, and a vertical plate 236 extending downward from a rear end of the horizontal plate 235. Thus, the transmission member 234 has an L-shaped cross-section as seen in a sectional view. In the width direction, the length of the transmission member 234 is substantially equal to the length of the submarine bar 52.

A front end of the horizontal plate 235 is, for example, in contact with and welded to a lower end portion of the vertical plate 58B from the rear side. Thus, the bag retainer 58 and the transmission member 234 are integrated. The horizontal plate 235 is disposed on the upper side of the submarine bar 52. The vertical plate 236 is disposed on the rear side of the submarine bar 52. The vertical plate 236 is disposed at a preset distance from the submarine bar 52 such that when a load directed frontward acts on the cushion airbag 54 in a frontal collision of the vehicle 10, the vertical plate 236 comes into contact with the submarine bar 52 in the front-rear direction and transmits the load to the submarine bar 52.

Workings and Effects

Next, the workings of the vehicle seat 220 of the sixth embodiment will be described.

Figure 17:
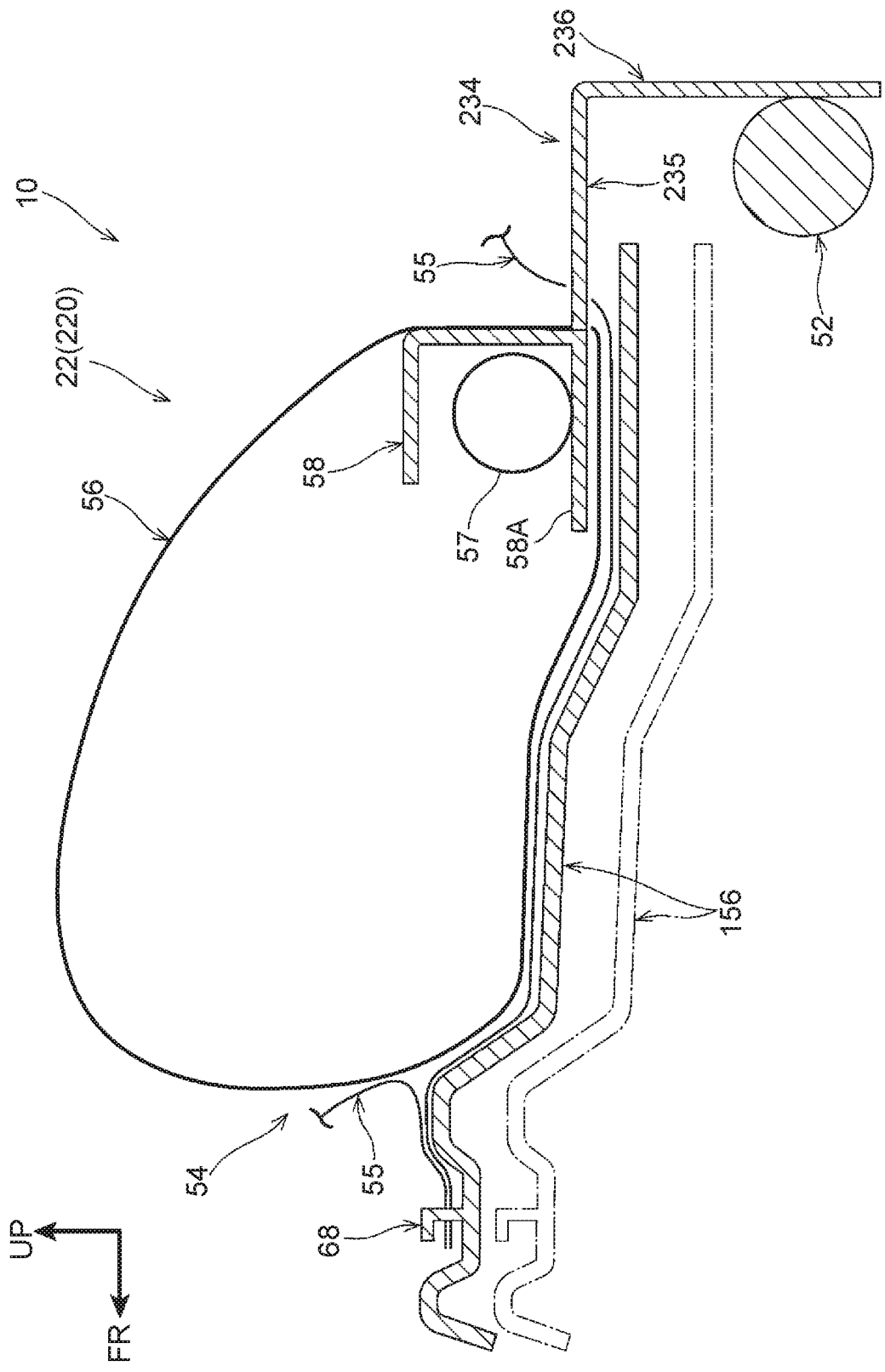
FIG. 17 is a vertical sectional view showing a state where an airbag main body of the vehicle seat shown in FIG. 16 is inflated and deployed.

When a frontal collision of the vehicle 10 shown in FIG. 17 occurs (with the occupant P in a comfortable posture), the airbag main body 56 inflates and deploys in the vehicle seat 220. A load directed frontward acts from the occupant P (see FIG. 2) on the inflated and deployed airbag main body 56. Thus, the airbag main body 56, the inflator 57, the bag retainer 58, and the transmission member 234 are shifted frontward as one unit. At this point, the vertical plate 236 comes into contact with the submarine bar 52.

The load having been transmitted from the airbag main body 56 to the bag retainer 58 is transmitted to the submarine bar 52 through the transmission member 234. Thus, the load acting on the airbag main body 56 is reduced, and the airbag main body 56 is restrained from deforming toward the seat front side. As the airbag main body 56 is restrained from deforming, a decrease in the reaction force that the occupant P receives from the airbag main body 56 is avoided. Therefore, the occupant P can be restrained from moving frontward by inertia in a frontal collision of the vehicle 10. In other words, the aforementioned submarine phenomenon can be avoided. The other workings of the vehicle seat 220 are the same as those of the vehicle seat 160 and therefore the description thereof will be omitted.

The present disclosure is not limited to the above-described embodiments.

Second Modified Example of First Embodiment

Figure 18:
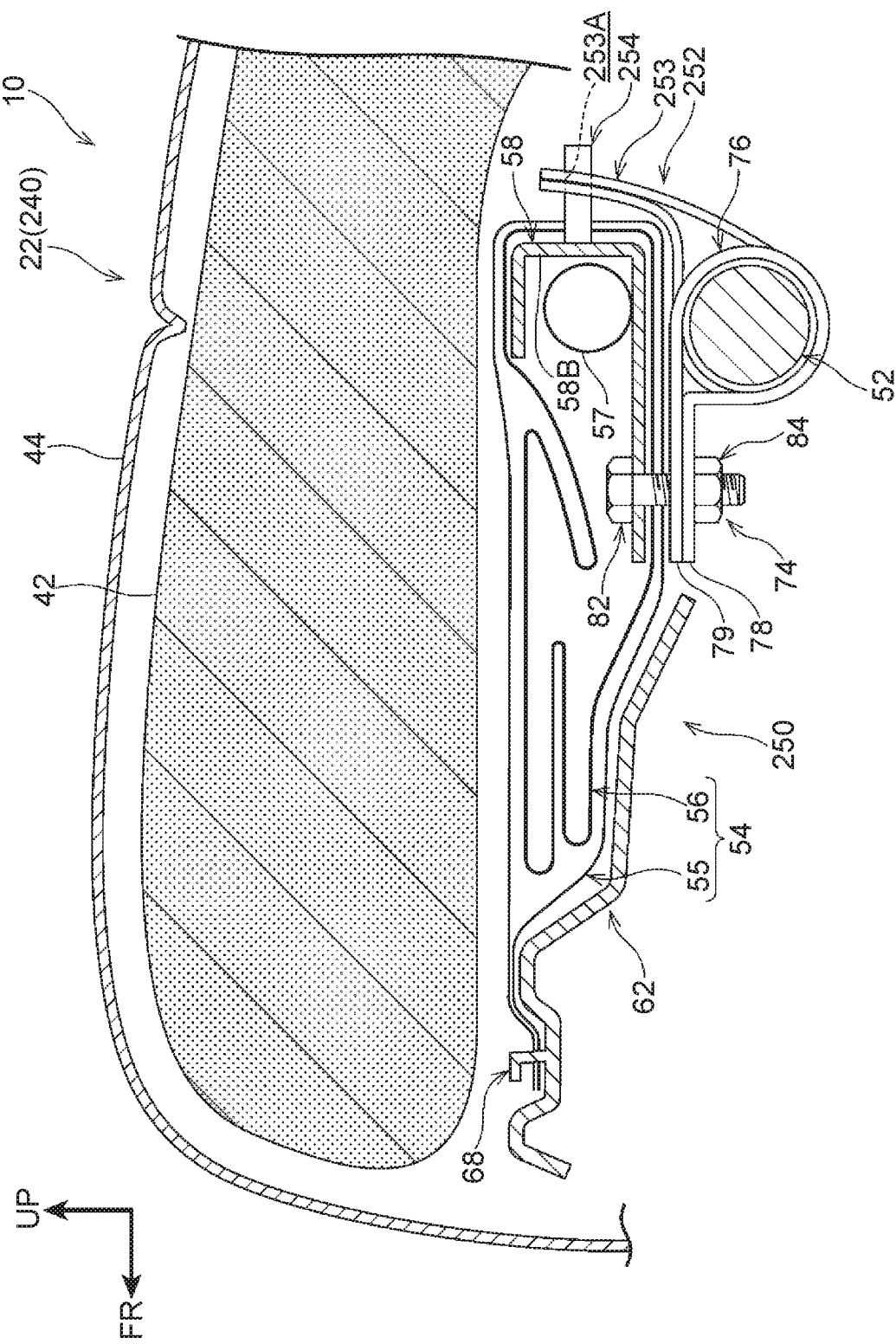
FIG. 18 is a vertical sectional view showing a configuration inside a seat cushion of a vehicle seat according to a second modified example of the first embodiment.

FIG. 18 shows a vehicle seat 240 as a second modified example of the first embodiment. Those components that are basically the same as in the first embodiment will be denoted by the same reference signs and the description thereof will be omitted. In FIG. 18, only main parts of the vehicle seat 240 are shown.

The vehicle seat 240 is different from the first embodiment in that the airbag mounting structure 50 of the vehicle seat 20 (see FIG. 3) is replaced with an airbag mounting structure 250. The airbag mounting structure 250 is different from the airbag mounting structure 50 in that it further has a hook part 254 and a connecting member 252.

The hook part 254 is a part protruding rearward from both end portions of the vertical plate 58B in the width direction. The hook part 254 has a substantially columnar shape with an axial direction oriented in the front-rear direction.

The connecting member 252 is made of, for example, fabric. As seen in a side view, both end portions of the connecting member 252 in a longitudinal direction are overlapped in a thickness direction, so that a part of the connecting member 252 has a tubular shape. This overlapping portion of the connecting member 252 will be referred to as a thick portion 253. A through-hole 253A extending through the thick portion 253 in a thickness direction is formed in the thick portion 253. The hook part 254 is inserted in the through-hole 253A. After the hook part 254 is inserted into the through-hole 253A, a cap (not shown) is fitted on a rear end portion of the hook part 254, so that the thick portion 253 does not slip out of the hook part 254.

As seen in a side view, the tubular part of the connecting member 252 is wrapped around a part of the outer circumferential surface of the submarine bar 52. Thus, in the vehicle seat 240, the connecting member 252 that connects the submarine bar 52 and the bag retainer 58 to each other is provided in addition to the transmission member 74.

In the vehicle seat 240, a load that acts on the airbag main body 56 as the occupant P (see FIG. 2) moves frontward by inertia in a frontal collision of the vehicle 10 (when the airbag main body 56 inflates and deploys) is transmitted from the bag retainer 58 to the submarine bar 52 through the transmission member 74. In this case, a load (moment) directed frontward acts on the airbag main body 56, which may cause the rear part of the airbag main body 56 to lift off upward. Since the submarine bar 52 and the bag retainer 58 are connected to each other by the connecting member 252, the bag retainer 58 is restrained from shifting relatively to the submarine bar 52, and the rear part of the airbag main body 56 is also restrained from shifting upward. Thus, the rear part of the airbag main body 56 can be restrained from lifting off upward.

Other Modified Examples

The vehicle seats 20, 90 may not be provided with the front panel 62. The front panel 62 may not have the hook parts 68 formed thereon. Further, a part of the cushion airbag 54 may be mounted with a fastening member, such as a screw.

In the vehicle seat 110, the transmission member 74 may be substituted by one of the transmission members 144, 172, 204, 234. The vehicle seat 110 may be provided with the airbag cover 55. Further, the vehicle seat 110 may be provided with the strap 174 and the connecting member 252.

In the vehicle seat 130, a blind hole may be formed instead of the through-hole 78A and the through-hole 79A, and the protruding member 145 may be inserted into the blind hole. The through-hole 158A may be omitted by reducing the length of the front panel 156 in the front-rear direction, and a lower end portion of the protruding member 145 may be inserted into only the through-hole 78A and the through-hole 79A. Further, the vehicle seat 130 may be provided with the front retainer 122, the bolt 126, the nut 128, and the connecting member 252.

In the vehicle seat 160, the hook part 254 may be formed on the bag retainer 58 so as to protrude and the connecting member 252 may be provided. In the case where the protruding member 173 is provided with the strap 174, a part of the strap 174 may be fixed to the protruding member 173 with a fastening member, such as a screw.

In the vehicle seat 180, the hook part 68 may be formed instead of the clip 202, and a part of the airbag cover 55 may be hung on the hook part 68. Instead of the rear flanges 195, 211, the front flanges 194, 209 may be fastened together with the bolt 214 from the lower side. The input part 196 may be disposed so as to cover the inflator 57 from the upper side as seen in a side view.

In the vehicle seat 220, the transmission member 234 is not limited to a member that is welded to the bag retainer 58, and may instead be a member that is mounted on the bag retainer 58 through a bracket (not shown). The transmission member 234 is not limited to a member having an L-shape as seen in a side view, and may instead be a member having an arc shape, polygonal shape, or curved shape. Further, the transmission member 234 is not limited to a member that covers the submarine bar 52 as seen in a plan view, and may instead be a member that covers the submarine bar 52 as seen in a bottom view.

In the vehicle seat 240, the front retainer 122 may be used to mount a part of the airbag cover 55 on the front panel 62.

In the vehicle seats 20, 90, 110, 130, 160, 180, 220, 240, the tilting mechanism 70 may be substituted by the lifting mechanism 102 or the lifting mechanism 102 may be substituted by the tilting mechanism 70. In the case where the lifting mechanism 102 is used, a link member (not shown) can be used to allow the side frames 34 and the submarine bar 52 to shift upward and downward as one unit.

The suspended member is not limited to a columnar member like the submarine bar 52, and may instead be a member having a cylindrical shape, rectangular cylindrical shape, or prism shape with an axial direction oriented in the width direction.

The retaining member may be either a member that is entirely disposed inside the cushion airbag 54 like the bag retainer 58 or a member that is partially disposed inside the cushion airbag 54 like the bag retainer 192. This means that at least a part of the retaining member should be disposed inside the cushion airbag.

Instead of a part of the cushion airbag cover, a non-inflating part at a front end of the cushion airbag may be hung on the hook part.

While embodiments and modified examples of the present disclosure have been described above, it should be understood that the present disclosure is not limited to these embodiments and modified examples and can be implemented with various other modifications made thereto within the scope of the gist of the disclosure.

What is claimed is:

1. A vehicle seat comprising:
   a seat cushion configured to be shifted in a seat up-down direction by a tilting mechanism or a lifting mechanism;
   a suspended member suspended across framework members that are provided inside the seat cushion, side by side at an interval in a seat width direction;
   a cushion airbag main body provided inside the seat cushion and configured to inflate and deploy upon being supplied with gas;
   a retaining member that is at least partially disposed inside the cushion airbag main body and is configured to retain an inflator that supplies the gas to the cushion airbag main body; and
   a transmission member configured to transmit, to the suspended member, a load that acts on the retaining member when the cushion airbag main body inflates and deploys in a state where the seat cushion has been shifted upward in the seat up-down direction, the transmission member including a protruding member that protrudes from the retaining member toward an outside of the cushion airbag main body, and a fixed member that has an insertion part into which a part of the protruding member is inserted so as to be relatively movable and that is fixed to the suspended member.

2. The vehicle seat according to claim 1, further comprising a panel member that is provided on a lower side of the cushion airbag main body in the seat up-down direction and supports the cushion airbag main body, wherein:
   the suspended member is disposed on the lower side of the cushion airbag main body in the seat up-down direction, on a rear side of the panel member in a seat front-rear direction; and
   the retaining member is disposed on an upper side of the suspended member in the seat up-down direction, at a rear end portion of an inside of the cushion airbag main body in the seat front-rear direction.

3. The vehicle seat according to claim 2, further comprising a cushion airbag cover that covers the cushion airbag main body, wherein the panel member includes a mount part on which a part of the cushion airbag cover or a part of the cushion airbag main body is mounted.

4. The vehicle seat according to claim 3, further comprising a mounting member which is provided inside the cushion airbag main body, on a front side of the retaining member in the seat front-rear direction, and by which the part of the cushion airbag main body is mounted on the mount part.

5. The vehicle seat according to claim 3, wherein the mount part is a hook part on which the part of the cushion airbag cover or the part of the cushion airbag main body is hung to mount the part of the cushion airbag cover or the part of the cushion airbag main body.

6. The vehicle seat according to claim 1, wherein the insertion part has a through-hole with such an inside diameter that a gap is left between the through-hole and an outer circumferential surface of the protruding member.

7. A vehicle seat comprising:
   a seat cushion configured to be shifted in a seat up-down direction by a tilting mechanism or a lifting mechanism;
   a suspended member suspended across framework members that are provided inside the seat cushion, side by side at an interval in a seat width direction;
   a cushion airbag main body provided inside the seat cushion and configured to inflate and deploy upon being supplied with gas;
   a retaining member that is at least partially disposed inside the cushion airbag main body and is configured to retain an inflator that supplies the gas to the cushion airbag main body; and
   a transmission member configured to transmit, to the suspended member, a load that acts on the retaining member when the cushion airbag main body inflates and deploys in a state where the seat cushion has been shifted upward in the seat up-down direction, the transmission member including a protruding member that protrudes from the retaining member toward an outside of the cushion airbag main body, and a fabric member that is provided on the protruding member and wrapped around the suspended member.

8. The vehicle seat according to claim 7, further comprising a panel member that is provided on a lower side of the cushion airbag main body in the seat up-down direction and supports the cushion airbag main body, wherein:
   the suspended member is disposed on the lower side of the cushion airbag main body in the seat up-down direction, on a rear side of the panel member in a seat front-rear direction; and
   the retaining member is disposed on an upper side of the suspended member in the seat up-down direction, at a rear end portion of an inside of the cushion airbag main body in the seat front-rear direction.

9. The vehicle seat according to claim 8, further comprising a cushion airbag cover that covers the cushion airbag main body, wherein the panel member includes a mount part on which a part of the cushion airbag cover or a part of the cushion airbag main body is mounted.

10. The vehicle seat according to claim 9, further comprising a mounting member which is provided inside the cushion airbag main body, on a front side of the retaining member in the seat front-rear direction, and by which the part of the cushion airbag main body is mounted on the mount part.

* * * * *